United States Patent
Witkowski et al.

(10) Patent No.: US 10,526,862 B2
(45) Date of Patent: Jan. 7, 2020

(54) HYDRAULIC FRACTURING SYSTEM, APPARATUS, AND METHOD

(71) Applicant: S.P.M. FLOW CONTROL, INC., Fort Worth, TX (US)

(72) Inventors: Brian C. Witkowski, Weatherford, TX (US); Nadiya Fuller, Plano, TX (US); Nuder Said, Fort Worth, TX (US); Duc Thanh Tran, Spring, TX (US); Peter Walter, Fort Worth, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 0 days.

(21) Appl. No.: 15/631,770

(22) Filed: Jun. 23, 2017

(65) Prior Publication Data
US 2017/0370199 A1 Dec. 28, 2017

Related U.S. Application Data

(60) Provisional application No. 62/354,101, filed on Jun. 23, 2016, provisional application No. 62/393,990,
(Continued)

(51) Int. Cl.
*E21B 33/068* (2006.01)
*E21B 33/038* (2006.01)
(Continued)

(52) U.S. Cl.
CPC .......... *E21B 33/068* (2013.01); *B01F 3/0853* (2013.01); *B01F 7/00008* (2013.01);
(Continued)

(58) Field of Classification Search
CPC ............ B01F 2215/0081; B01F 3/0853; B01F 7/00008; E21B 33/038; E21B 33/068;
(Continued)

(56) References Cited

U.S. PATENT DOCUMENTS

2011/0272158 A1* 11/2011 Neal ........................ B67D 7/36
166/305.1
2012/0181046 A1 7/2012 Kajaria
(Continued)

OTHER PUBLICATIONS

Copenheaver, Blaine R., "International Search Report", International Application No. PCT/US2017/039020, dated Nov. 6, 2017, 6 pages.
(Continued)

*Primary Examiner* — James G Sayre
(74) *Attorney, Agent, or Firm* — Foley & Lardner LLP

(57) ABSTRACT

An apparatus according to which a subterranean formation in which a wellbore extends is hydraulically fractured, the apparatus comprising first and second manifolds, the first manifold including first and second flow lines adapted to be in fluid communication with first and second pumps, respectively, the first pump being adapted to pressurize fluid received from the first flow line, and the second pump being adapted to pressurize fluid received from the second flow line, and the second manifold including a third flow line adapted to convey pressurized fluid from the first and second pumps to the wellbore to hydraulically fracture the subterranean formation in which the wellbore extends. The apparatus is adapted to be connected to another apparatus used to hydraulically fracture the subterranean formation in which the wellbore extends by moving one, or both, of the first and second flow lines relative to the third flow line.

7 Claims, 20 Drawing Sheets

Related U.S. Application Data filed on Sep. 13, 2016, provisional application No. 62/412,230, filed on Oct. 24, 2016, provisional application No. 62/421,019, filed on Nov. 11, 2016.

(51) Int. Cl.

| | | |
|---|---|---|
| *E21B 43/26* | (2006.01) | |
| *F16K 5/04* | (2006.01) | |
| *F16K 11/048* | (2006.01) | |
| *F16K 31/126* | (2006.01) | |
| *B01F 3/08* | (2006.01) | |
| *B01F 7/00* | (2006.01) | |
| *F04B 23/06* | (2006.01) | |
| *F16L 41/03* | (2006.01) | |
| *F04B 15/02* | (2006.01) | |
| *F04B 23/04* | (2006.01) | |
| *F04B 47/00* | (2006.01) | |
| *F16K 5/00* | (2006.01) | |
| *F16K 11/00* | (2006.01) | |

(52) U.S. Cl.
CPC ............ *E21B 33/038* (2013.01); *E21B 43/26* (2013.01); *F04B 15/02* (2013.01); *F04B 23/04* (2013.01); *F04B 23/06* (2013.01); *F04B 47/00* (2013.01); *F16K 5/04* (2013.01); *F16K 11/048* (2013.01); *F16K 31/126* (2013.01); *F16L 41/03* (2013.01); *B01F 2215/0081* (2013.01); *F16K 5/00* (2013.01); *F16K 11/00* (2013.01)

(58) Field of Classification Search
CPC .......... E21B 43/26; F04B 15/02; F04B 23/04; F04B 23/06; F04B 47/00; F16K 11/00; F16K 11/048; F16K 31/126; F16K 5/00; F16K 5/04; F16L 41/03
See application file for complete search history.

(56) References Cited

U.S. PATENT DOCUMENTS

| | | |
|---|---|---|
| 2012/0242081 A1 | 9/2012 | Keays et al. |
| 2013/0175039 A1 | 7/2013 | Guidry |
| 2013/0233560 A1* | 9/2013 | Davidson ................ E21B 43/26 |
| | | 166/308.1 |
| 2015/0000766 A1 | 1/2015 | Arizpe et al. |
| 2017/0122060 A1* | 5/2017 | Dille ..................... B60P 3/2205 |
| 2017/0138144 A1 | 5/2017 | Christopherson et al. |
| 2017/0268306 A1* | 9/2017 | Kajaria .................... F16L 41/03 |
| 2018/0187662 A1* | 7/2018 | Hill ........................ F04B 47/02 |
| 2018/0298735 A1* | 10/2018 | Conrad ................... E21B 43/26 |

OTHER PUBLICATIONS

Copenheaver, Blaine R., Written Opinion, International Application No. PCT/US2017/039020, dated Nov. 6, 2017, 11 pages.

* cited by examiner

HYDRAULIC FRACTURING SYSTEM, APPARATUS, AND METHOD

CROSS-REFERENCE TO RELATED APPLICATIONS

This application claims the benefit of the filing date of, and priority to, U.S. Application No. 62/354,101, filed Jun. 23, 2016, the entire disclosure of which is hereby incorporated herein by reference.

This application also claims the benefit of the filing date of, and priority to, U.S. Application No. 62/393,990, filed Sep. 13, 2016, the entire disclosure of which is hereby incorporated herein by reference.

This application also claims the benefit of the filing date of, and priority to, U.S. Application No. 62/412,230, filed Oct. 24, 2016, the entire disclosure of which is hereby incorporated herein by reference.

This application also claims the benefit of the filing date of, and priority to, U.S. Application No. 62/421,019, filed Nov. 11, 2016, the entire disclosure of which is hereby incorporated herein by reference.

TECHNICAL FIELD

The present disclosure relates in general to hydraulic fracturing systems used in oil and gas exploration and production operations and, in particular, to a hydraulic fracturing system including a modular pressurization manifold.

BACKGROUND

In oil or gas operations, hydraulic fracturing systems may be used to fracture one or more subterranean formations by conveying pressurized hydraulic fracturing fluid to one or more wellbores traversing the subterranean formation(s), the wellbore(s) each having a wellhead located at the surface termination thereof. These hydraulic fracturing systems require temporary surface lines, valves, and manifolds (collectively referred to as "frac iron") to deliver the hydraulic fracturing fluid from mixing and pumping equipment to one or more fracturing trees connected to the respective wellhead(s). For example, a fracturing manifold may be used to communicate the hydraulic fracturing fluid to multiple fracturing trees. In addition, a pressurization manifold may be used to communicate the hydraulic fracturing fluid to the fracturing manifold from multiple hydraulic fracturing pumps. Many hydraulic fracturing systems utilize conventional frac iron connected to, from, or between: each of the various components of the fracturing manifold, the pressurization manifold and the fracturing manifold, each of the various components of the pressurization manifold, and/or each of the fracturing trees and the fracturing manifold. This conventional frac iron is overly complex and creates a multitude of issues at the work site including, but not limited to, excessive setup time and labor costs, limited adjustability, safety risks associated with potential leak points, and decreased pumping efficiency. In extreme cases, conventional frac iron may decrease the effectiveness of fracturing operations, thereby presenting a problem for operators dealing with challenges such as, for example, continuous duty operations, harsh downhole environments, and multiple extended-reach lateral wells, among others. Therefore, what is needed is an apparatus, system, or method to address one or more of the foregoing issues, and/or one or more other issues.

SUMMARY

In a first aspect, the present disclosure introduces an apparatus used to hydraulically fracture a subterranean formation in which a wellbore extends, the apparatus including a first manifold including first and second flow lines adapted to be in fluid communication with first and second pumps, respectively, the first pump being adapted to pressurize fluid received from the first flow line, and the second pump being adapted to pressurize fluid received from the second flow line; and a second manifold including a third flow line adapted to convey pressurized fluid from the first and second pumps to the wellbore to hydraulically fracture the subterranean formation in which the wellbore extends.

In an embodiment, the apparatus is adapted to be connected to another apparatus used to hydraulically fracture the subterranean formation in which the wellbore extends; and one, or both, of the first and second flow lines are movable relative to the third flow line to permit the connection of the apparatus to the another apparatus.

In an embodiment, the apparatus further includes a skid to which the first and second manifolds are mounted, the skid including first and second rails; and first and second trucks to which the first and second flow lines, respectively, are connected; wherein one, or both, of the first and second trucks are movable along the first and second rails, respectively, to thereby permit the movement of one, or both, of the first and second flow lines relative to the third flow line.

In an embodiment, the second manifold further includes a fluid block connected to the third flow line and adapted to receive the pressurized fluid from the first and second pumps; and first and second valves connected to the fluid block and adapted to selectively prevent communication of the pressurized fluid from the first and second pumps, respectively, to the wellbore.

In an embodiment, the second manifold is supported in an elevated position above the first manifold so that the third flow line is vertically offset from the first and second flow lines.

In an embodiment, the first, second, and third flow lines define first, second, and third, inner diameters, the third inner diameter being greater than the first and second inner diameters.

In an embodiment, the apparatus further includes a zipper manifold adapted to convey the pressurized fluid from the second manifold to the wellbore and at least one other wellbore extending in the subterranean formation to hydraulically fracture the subterranean formation in which the wellbore and the at least one other wellbore extend.

In a second aspect, the present disclosure introduces a system used to hydraulically fracture a subterranean formation in which a wellbore extends, the system including a first manifold adapted to be in fluid communication with first and second pumps, the first and second pumps being adapted to pressurize fluid received from the first manifold; a second manifold adapted to receive pressurized fluid from the first and second pumps; a third manifold adapted to be in fluid communication with third and fourth pumps, the third and fourth pumps being adapted to pressurize fluid received from the third manifold; a fourth manifold adapted to receive pressurized fluid from the third and fourth pumps; wherein the first manifold is adapted to be connected to, and in fluid communication with, the third manifold; and wherein, one, or both, of the first and third manifolds are movable, relative to the second and fourth manifolds, respectively, to permit the connection of the first manifold to the third manifold.

In an embodiment, the second manifold is adapted to be connected to, and in fluid communication with, the fourth manifold to convey the pressurized fluid from the first, second, third, and fourth pumps to the wellbore to hydraulically fracture the subterranean formation in which the wellbore extends.

In an embodiment, the first manifold includes first and second flow lines adapted to be in fluid communication with the first and second pumps, respectively; the third manifold includes third and fourth flow lines adapted to be in fluid communication with the third and fourth pumps, respectively; and the third and fourth flow lines are adapted to be connected to, and in fluid communication with, the first and second flow lines.

In an embodiment, one, or both, of the first and third flow lines are movable relative to the second and fourth manifolds, respectively, to permit the connection of the third flow line to the first flow line; and one, or both, of the second and fourth flow lines are movable relative to the second and fourth manifolds, respectively, to permit the connection of the fourth flow line to the second flow line.

In an embodiment, the system further includes a first skid to which the first and second manifolds are mounted, the first skid including first and second rails; a second skid to which the third and fourth manifolds are mounted, the second skid including third and fourth rails; and first, second, third, and fourth trucks to which the first, second, third, and fourth flow lines, respectively, are connected; wherein one, or both, of the first and third trucks are movable along the first and third rails, respectively, to thereby permit the movement of one, or both, of the first and third flow lines relative to the second and fourth manifolds, respectively; and wherein one, or both, of the second and fourth trucks are movable along the second and fourth rails, respectively, to thereby permit the movement of one, or both, of the second and fourth flow lines relative to the second and fourth manifolds, respectively.

In an embodiment, the second manifold includes a fifth flow line, the second manifold being supported in an elevated position above the first manifold so that the fifth flow line is vertically offset from the first and second flow lines; and the fourth manifold includes a sixth flow line, the fourth manifold being supported in an elevated position above the third manifold so that the sixth flow line is vertically offset from the third and fourth flow lines.

In an embodiment, the first, second, and fifth flow lines define first second and third inner diameters, respectively, the third inner diameter being greater than the first and second inner diameters; and the third, fourth, and sixth flow lines define fourth, fifth, and sixth inner diameters, respectively, the sixth inner diameter being greater than the fourth and fifth inner diameters.

In an embodiment, the system further includes a zipper manifold adapted to convey the pressurized fluid from the second manifold to the wellbore and at least one other wellbore extending in the subterranean formation to hydraulically fracture the subterranean formation in which the wellbore and the at least one other wellbore extend.

In a third aspect, the present disclosure introduces a method of hydraulically fracturing a subterranean formation in which a wellbore extends, the method including providing first and second manifolds, the first manifold being adapted to be in fluid communication with first and second pumps, the first and second pumps being adapted to pressurize fluid received from the first manifold, and the second manifold being adapted to receive pressurized fluid from the first and second pumps; providing third and fourth manifolds adjacent the first and second manifolds, respectively, the third manifold being adapted to be in fluid communication with third and fourth pumps, the third and fourth pumps being adapted to pressurize fluid received from the third manifold, and the fourth manifold being adapted to receive pressurized fluid from the third and fourth pumps; connecting the fourth manifold to the second manifold; connecting the first manifold to the third manifold by moving one, or both, of the first and third manifolds relative to the connected second and fourth manifolds, respectively; and communicating pressurized fluid from the first, second, third, and fourth pumps to the wellbore via the second and fourth manifolds to hydraulically fracture the subterranean formation in which the wellbore extends.

In an embodiment, the first manifold includes first and second flow lines adapted to be in fluid communication with the first and second pumps, respectively; and the third manifold includes third and fourth flow lines adapted to be in fluid communication with the third and fourth pumps, respectively.

In an embodiment, connecting the first manifold to the third manifold further includes connecting: the third flow line to the first flow line, and the fourth flow line to the second flow line; and moving one, or both, of the first and third manifolds relative to the second and fourth manifolds, respectively, includes moving: one, or both, of the first and third flow lines relative to the second and fourth manifolds, respectively, and one, or both, of the second and fourth flow lines relative to the second and fourth manifolds, respectively.

In an embodiment, the method further includes mounting the first and second manifolds to a first skid including first and second rails; and mounting the third and fourth manifolds to a second skid including third and fourth rails.

In an embodiment, the method further includes connecting the first, second, third, and fourth flow lines to first, second, third, and fourth trucks, respectively; wherein moving one, or both, of the first and third flow lines relative to the second and fourth manifolds, respectively, includes moving one, or both, of the first and third trucks along the first and third rails, respectively; and wherein moving one, or both, of the second and fourth flow lines relative to the second and fourth manifolds, respectively, includes moving one, or both, of the second and fourth trucks along the second and fourth rails, respectively.

In an embodiment, the second manifold includes a fifth flow line and the fourth manifold includes a sixth flow line; mounting the first and second manifolds to the first skid includes supporting the second manifold in an elevated position above the first manifold so that the fifth flow line is vertically offset from the first and second flow lines; and mounting the third and fourth manifolds to the second skid includes supporting the fourth manifold in an elevated position above the third manifold so that the sixth flow line is vertically offset from the third and fourth flow lines.

In an embodiment, the second manifold includes a fifth flow line and the fourth manifold includes a sixth flow line; the first, second, and fifth flow lines define first, second, and third inner diameters, respectively, the third inner diameter being greater than the first and second inner diameters; and the third, fourth, and sixth flow lines define fourth, fifth, and sixth inner diameters, respectively, the sixth inner diameter being greater than the fourth and fifth inner diameters.

In an embodiment, the method further includes providing a zipper manifold adapted to convey the pressurized fluid from the second manifold to the wellbore and at least one other wellbore extending in the subterranean formation to hydraulically fracture the subterranean formation in which the wellbore and the at least one other wellbore extend.

In a fourth aspect, the present disclosure introduces, a system used to hydraulically fracture a subterranean formation in which a wellbore extends, the system including a skid; and a fluid conduit mounted on the skid and adapted to be in fluid communication with a manifold to convey the pressurized fluid from the manifold to the wellbore to hydraulically fracture the subterranean formation in which the wellbore extends, the fluid conduit having a first inner diameter and including a fluid block defining a flow passage having the first inner diameter and a side port via which one or more instrumentation components are adapted to be in fluid communication with the flow passage, the side port having a second inner diameter that is less than the first inner diameter, and one or more valves in fluid communication with the fluid block.

In an embodiment, the first inner diameter is about 7 inches and the second inner diameter is about 3 inches.

In an embodiment, the one or more valves include a check valve and first and second plug valves connected to each other in series, the first and second plug valves being operable to selectively prevent communication of the pressurized fluid from the manifold to the wellbore via the fluid conduit, and the check valve being operable to limit backflow of the pressurized fluid from the wellbore to the manifold via the fluid conduit.

In an embodiment, the system further includes a zipper manifold adapted to convey the pressurized fluid from the fluid conduit to the wellbore and at least one other wellbore extending in the subterranean formation to hydraulically fracture the subterranean formation in which the wellbore and the at least one other wellbore extend.

DETAILED DESCRIPTION

Figure 1A:
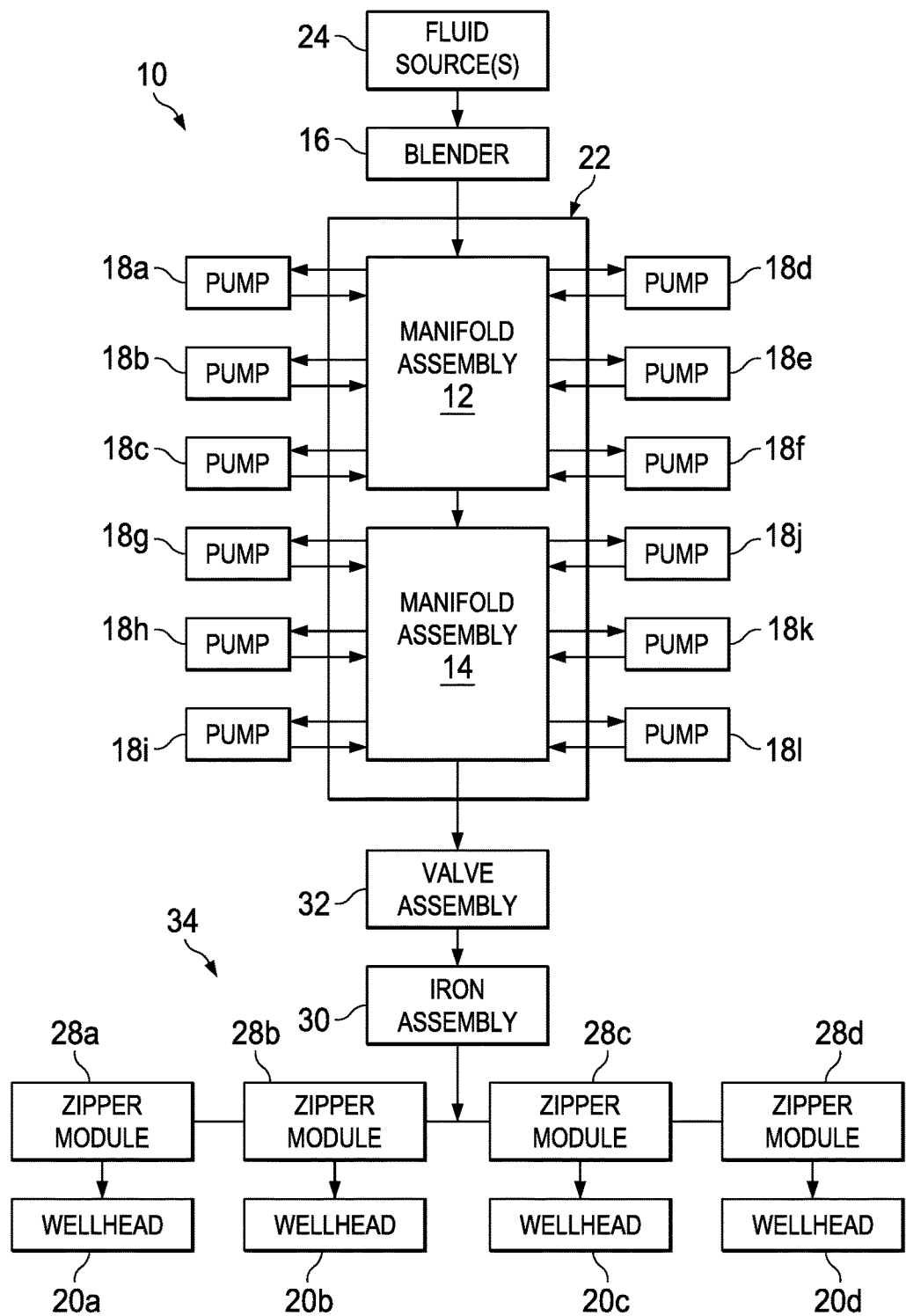
FIG. 1A is a schematic illustration of a hydraulic fracturing system including, inter alia, first and second manifold assemblies, a valve assembly, and an iron assembly, and a zipper manifold, according to one or more embodiments of the present disclosure.
Figure 1B:
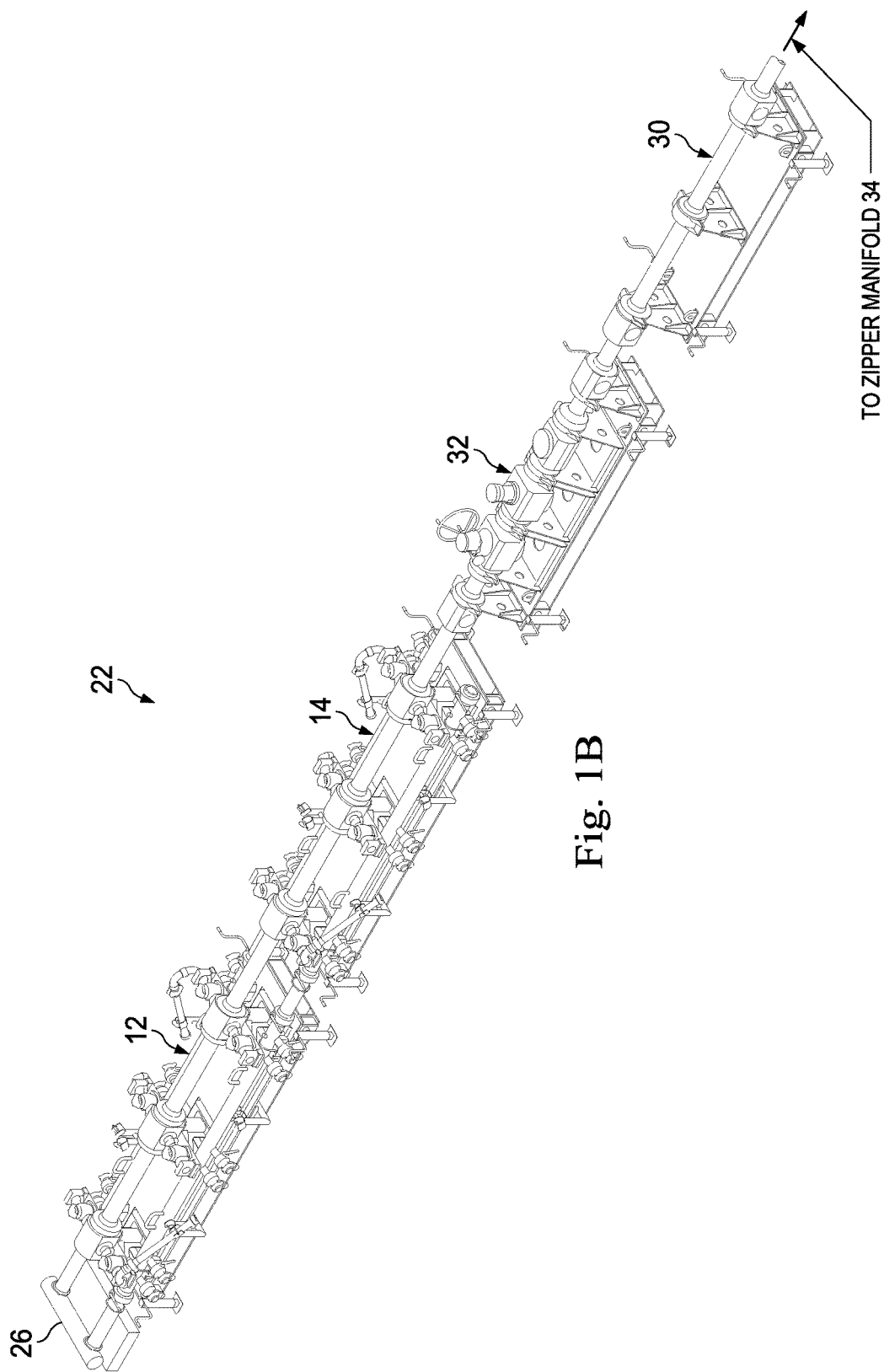
FIG. 1B is a perspective view of the first and second manifold assemblies, the valve assembly, and the iron assembly of FIG. 1A, the first manifold assembly being connected to a rear header, according to one or more embodiments of the present disclosure.

Turning to FIGS. 1A and 1B, a system is generally referred to by the reference numeral 10 and includes manifold assemblies 12 and 14 in fluid communication with a blender 16, hydraulic fracturing pumps 18a-1, and wellheads 20a-d. The manifold assemblies 12 and 14 are interconnected with each other to form a pressurization manifold 22. The blender 16 is in fluid communication with one or more fluid sources 24 and a rear header 26 (shown in FIG. 1B) connected to the manifold assembly 12. The wellheads 20a-d are in fluid communication with the pressurization manifold 22 via, for example, zipper modules 28a-d, an iron assembly 30, and a valve assembly 32, as shown in FIG. 1A. The zipper modules 28a-d are connected to the wellheads 20a-d, respectively, and are interconnected with each other to form a zipper manifold 34. The iron assembly 30 and the valve assembly 32 are connected in series between the pressurization manifold 22 and the zipper manifold 34. In an embodiment, the system 10 is part of a hydraulic fracturing (or "frac") system, which may be used to facilitate oil and gas exploration and production operations. The embodiments provided herein are not, however, limited to a hydraulic fracturing system, as the embodiments may be used with, or adapted to, a mud pump system, a well treatment system, other pumping systems, one or more systems at the wellheads 20a-d, one or more systems upstream of the wellheads 20a-d, one or more systems downstream of the wellheads 20a-d, or one or more other systems associated with the wellheads 20a-d.

The manifold assemblies 12 and 14 are identical to one another, and, therefore, in connection with FIGS. 2A, 2B, and 3-9, only the manifold assembly 12 will be described in detail below; however, the description below applies to both of the manifold assemblies 12 and 14. Moreover, the hydraulic fracturing pumps 18g-1 are connected to the manifold assembly 14 in substantially the same manner that the hydraulic fracturing pumps 18a-f are connected to the manifold assembly 12 and, therefore, in connection with FIGS. 2A, 2B, and 3-9, only the connection of the hydraulic fracturing pumps 18a-f to the manifold assembly 12 will be described in detail below; however, the description below applies equally to the manner in which the hydraulic fracturing pumps 18g-1 are connected to the manifold assembly 14.

Figure 2A:
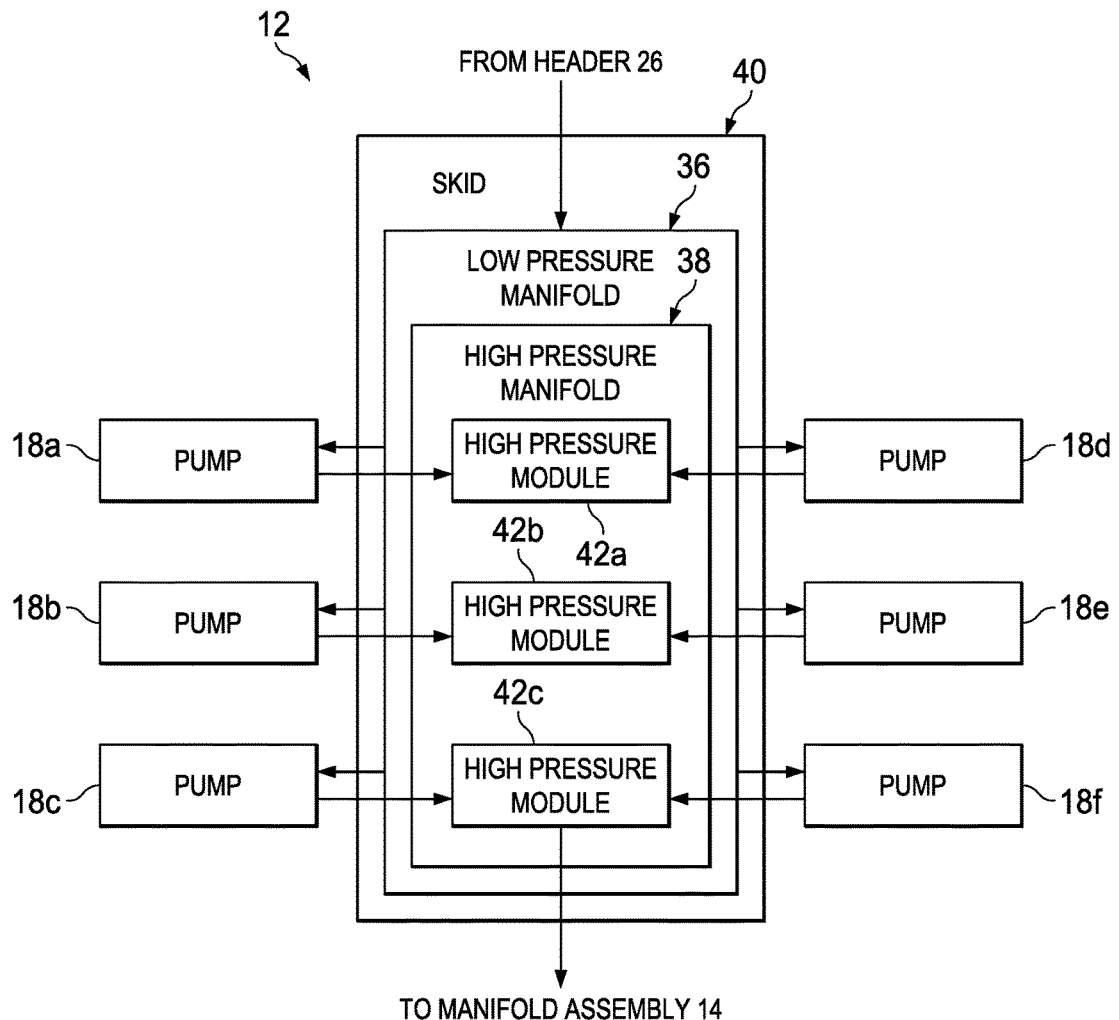
FIG. 2A is a diagrammatic illustration of the first manifold assembly of FIGS. 1A and 1B, the first manifold assembly including a high pressure manifold, a low pressure manifold, and a skid, according to one or more embodiments of the present disclosure.
Figure 2B:
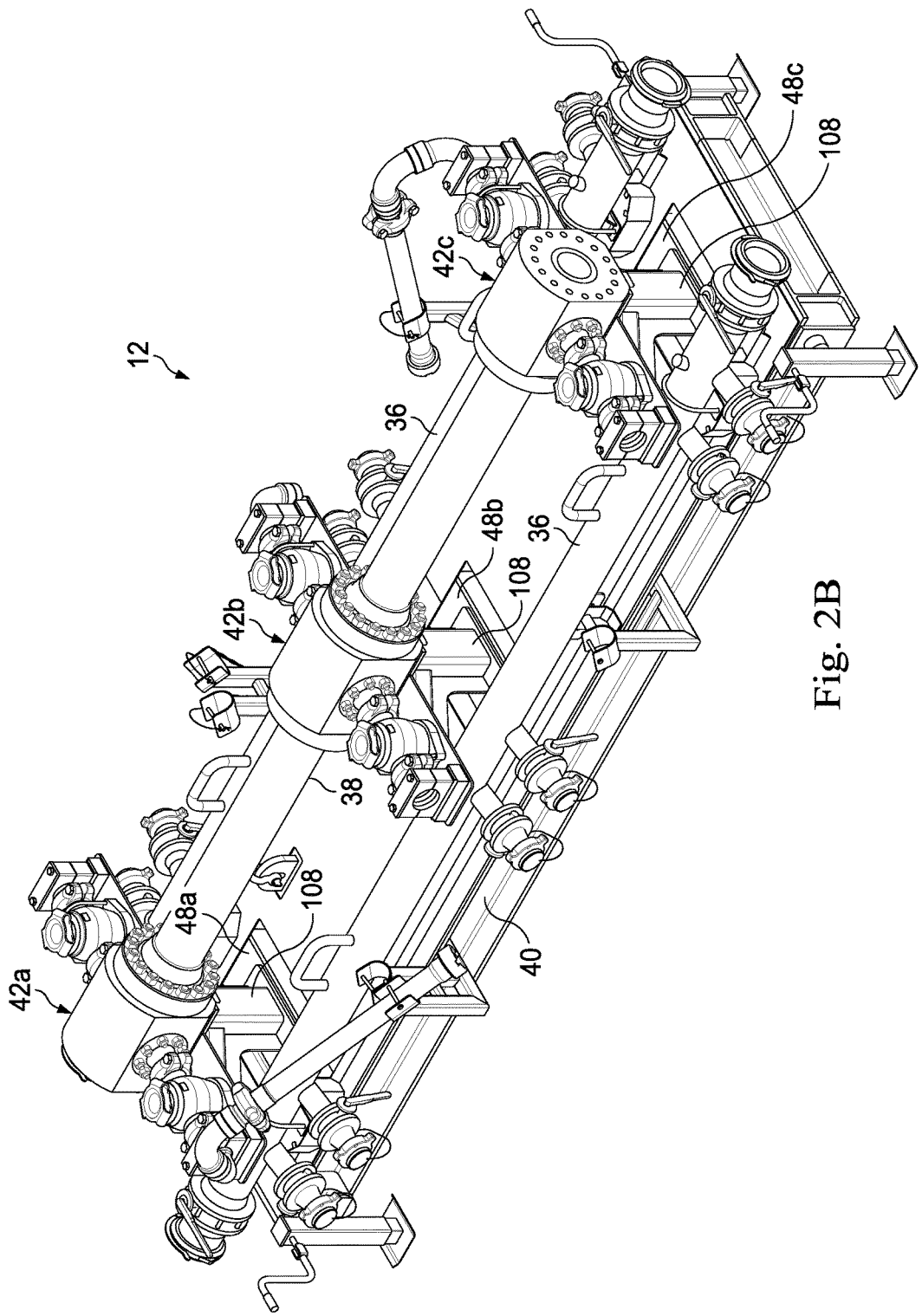
FIG. 2B is a perspective view of the first manifold assembly of FIG. 2A, according to one or more embodiments of the present disclosure.

Turning to FIGS. 2A and 2B, the manifold assembly 12 includes a low pressure manifold 36 and a high pressure manifold 38, both of which are mounted on, and connected to, a skid 40. The hydraulic fracturing pumps 18a-f are each in fluid communication with both the low pressure manifold 36 and the high pressure manifold 38. The low pressure manifold 36 communicates hydraulic fracturing fluid from the blender 16 (via the rear header 26) to the hydraulic fracturing pumps 18a-f. The high pressure manifold 38 includes high pressure modules 42a-c connected to each other in series; the high pressure module 42a receives the hydraulic fracturing fluid from the hydraulic fracturing pumps 18a and 18d; the high pressure module 42b receives the hydraulic fracturing fluid from the hydraulic fracturing pumps 18b and 18e; and the high pressure module 42c receives the hydraulic fracturing fluid from the hydraulic fracturing pumps 18c and 18f. In several embodiments, each of the hydraulic fracturing pumps 18a-f is, includes, or is part of, a positive displacement pump, a reciprocating pump assembly, a frac pump, a pump truck, a truck, a trailer, or any combination thereof.

Figure 3:
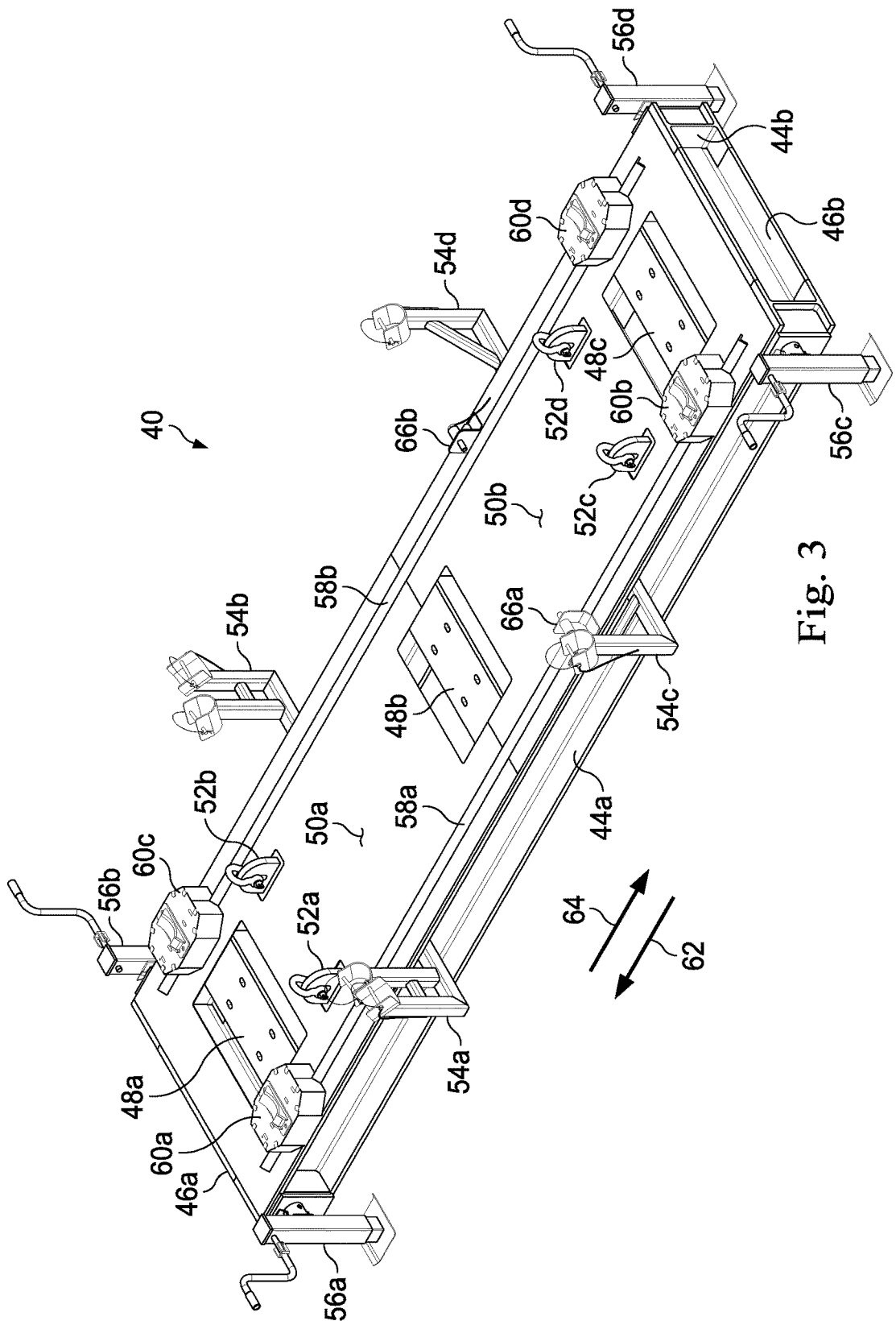
FIG. 3 is a perspective view of the skid of FIGS. 2A and 2B, the skid including one or more trucks adapted to support the low pressure manifold, according to one or more embodiments of the present disclosure.

Turning to FIG. 3, with continuing reference to FIGS. 2A and 2B, the skid 40 includes, inter alia, longitudinally-extending structural members 44a and 44b, transversely-extending end members 46a and 46b connected to respective opposing end portions of the longitudinally-extending structural members 44a and 44b, and transversely-extending structural members 48a-c connecting the longitudinally-extending structural members 44a and 44b and extending between the transversely-extending end members 46a and 46b. The skid 40 includes carriage plates 50a and 50b. The carriage plate 50a is supported on the longitudinally-extending structural members 44a and 44b, the transversely-extending end member 46a and the transversely-extending structural members 48a and 48b, and the carriage plate 50b is supported on the longitudinally-extending structural members 44a and 44b, the transversely-extending end member 46b and the transversely-extending structural members 48b and 48c. In some embodiments, the carriage plates 50a and 50b are integrally formed.

The skid 40 also includes lifting tabs 52a-d and transport brackets 54a-d. The lifting tabs 52a and 52b are connected to a transversely-extending structural member (not shown) extending between the transversely-extending structural members 48a and 48b and connected to the longitudinally-extending structural members 44a and 44b. The lifting tabs 52c and 52d are connected to another transversely-extending structural member (not shown) extending between the transversely-extending structural members 48b and 48c and connected to the longitudinally-extending structural members 44a and 44b. The transport brackets 54a and 54c are connected to the longitudinally-extending structural member 44a, and the transport brackets 54b and 54d are connected to the longitudinally-extending structural member 44b. The transport brackets 54a and 54b are adapted to support flow line components (not visible in FIG. 3) for connecting the high pressure module 42a to the hydraulic fracturing pumps 18a and 18d, and flow line components for connecting the high pressure module 42b to the hydraulic fracturing pumps 18b and 18e. The transport brackets 54c and 54d are adapted to support flow line components for connecting the high pressure module 42c to the hydraulic fracturing pumps 18c and 18f. The skid 40 is supported by jacks 56a-d connected, for example, to the respective opposing end portions of the longitudinally-extending structuring members 44a and 44b. The jacks 56a-d are operable to level, and to adjust the height of, the skid 40, as will be discussed in further detail below.

In addition, the skid 40 includes a pair of longitudinally-extending rails 58a and 58b connected to the carriage plates 50a and 50b. The longitudinally-extending rails 58a and 58b support trucks 60a-d. The trucks 60a-d are movable along the rails 58a or 58b in opposing longitudinal directions, as indicated by arrows 62 and 64, to permit alignment and connection of the manifold assembly 12's low pressure manifold 36 with the corresponding low pressure manifold (not visible in FIG. 3) of the manifold assembly 14, as will be discussed in further detail below. The skid 40 also includes locking tabs 66a and 66b adjacent the longitudinally-extending rails 58a and 58b, respectively. The locking tabs 66a and 66b are adapted to secure the manifold assembly 12's low pressure manifold 36 in place after the low pressure manifold 36 is aligned with, and connected to, the corresponding low pressure manifold of the manifold assembly 14.

Figure 4:
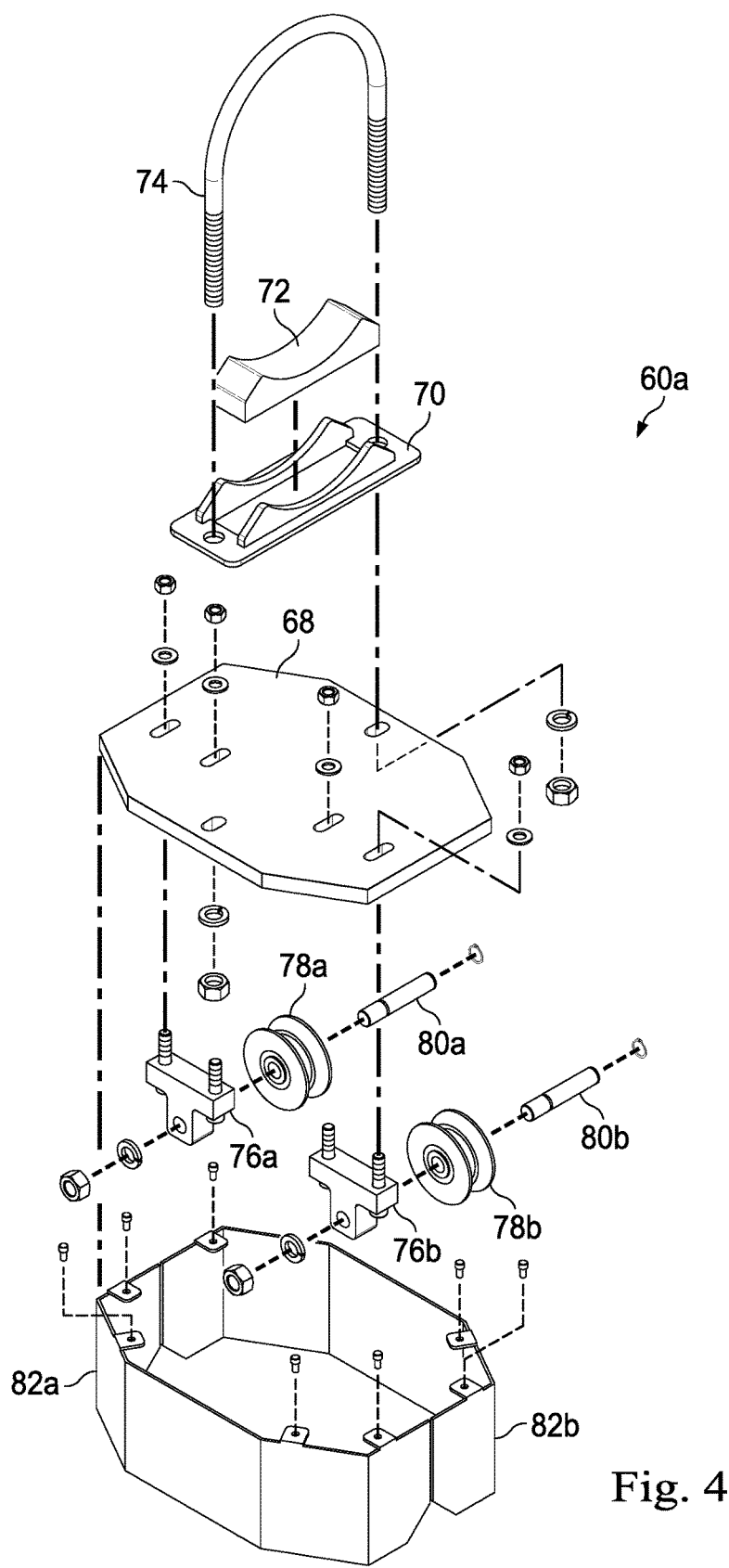
FIG. 4 is an exploded perspective view of one of the trucks of FIG. 3, according to one or more embodiments of the present disclosure.

The trucks 60a-d are identical to one another and, therefore, in connection with FIG. 4, only the truck 60a will be described in detail below; however, the description below applies to every one of the trucks 60a-d. Turning to FIG. 4, the truck 60a includes a mounting plate 68, a shoe bracket 70, a shoe 72, and a fastener 74 (e.g., a u-bolt). The shoe bracket 70 is adapted to accommodate the shoe 72. The fastener 74 is adapted to connect the shoe bracket 70 to the mounting plate 68, and to secure one or more components of the low pressure manifold 36 against the shoe 72. The truck 60a also includes axle blocks 76a and 76b, rail wheels 78a and 78b, and axles 80a and 80b. The axle blocks 76a and 76b are adapted to be connected to the mounting plate 68 opposite the shoe bracket 70, and the rail wheels 78a and 78b are adapted to be connected to the axle blocks 76a and 76b via the axles 80a and 80b. The rail wheels 78a and 78b are adapted to support and maintain the truck 60a on the longitudinally-extending rail 58a as the truck 60a moves along the rail 58a in the opposing longitudinal directions 62 and 64. The truck 60a includes skirt segments 82a and 82b adapted to be connected to the mounting plate 68 to conceal the rail wheels 78a and 78b and to balance the truck 60a on the longitudinally-extending rail 58a via contact with carriage plate 50a or 50b. The skirt segments 82a and 82b are recessed to accommodate the longitudinally-extending rail 58a as the truck 60a moves along the rail 58a in the opposing longitudinal directions 62 and 64.

Figure 5:
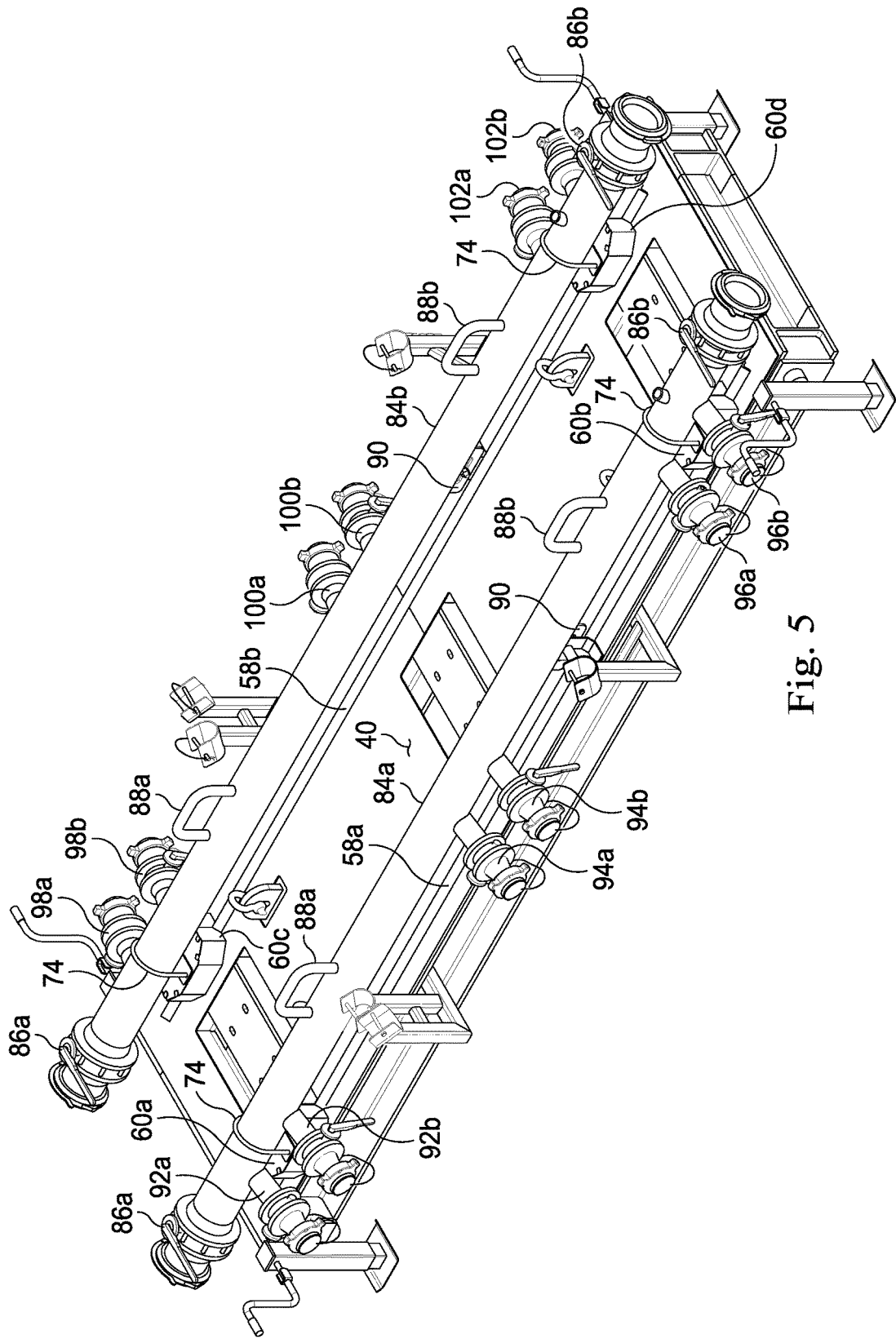
FIG. 5 is a perspective view of the low pressure manifold (shown in FIGS. 2A and 2B) supported on the skid (shown in FIGS. 2A, 2B, and 3) by the one or more trucks (shown in FIGS. 3 and 4), according to one or more embodiments of the present disclosure.

Turning to FIG. 5, with continuing reference to FIGS. 3 and 4, the low pressure manifold 36 includes longitudinally-extending tubular members, or flow lines 84a and 84b. The flow lines 84a and 84b are spaced in a substantially parallel relation, and are adapted to be in fluid communication with the blender 16 via the rear header 26 (shown in FIG. 1B). The flow line 84a is secured to the trucks 60a and 60b, and the flow line 84b is secured to the trucks 60c and 60d, via the respective fasteners 74. As a result, the flow line 84a is mounted to the skid 40 via the trucks 60a and 60b, and the flow line 84b is mounted to the skid 40 via the trucks 60c and 60d. The flow lines 84a and 84b are thus each movable in either of the longitudinal directions 62 and 64 via displacement of the trucks 60a-d along the longitudinally-extending rails 58a and 58b. In an embodiment, the low pressure manifold 36 is mounted on the skid 40 by lowering the flow lines 84a and 84b down and then ensuring that the respective fasteners 74 extend about the flow lines 84a and 84b and engage the trucks 60-d.

The flow lines 84a and 84b each include valves 86a and 86b such as, for example, butterfly valves, at or near opposing end portions thereof. The flow lines 84a and 84b each include handles 88a and 88b extending therefrom to facilitate movement of the flow lines 84a and 84b along the longitudinally-extending rails 58a and 58b via the trucks 60a-d in the opposing longitudinal directions 62 and 64. The flow lines 84a and 84b each include a locking tab 90 adapted to engage the skid 40's locking tabs 66a or 66b to secure the manifold assembly 12's low pressure manifold 36 in place after the low pressure manifold 36 is aligned with, and connected to, the corresponding low pressure manifold of the manifold assembly 14.

The hydraulic fracturing pumps 18a, 18b, and 18c (shown in FIGS. 1A and 2A; not visible in FIG. 5) are adapted to be in fluid communication with the flow line 84a via one of outlet ports 92a and 92b, one of outlet ports 94a and 94b, and one of outlet ports 96a and 96b, respectively; such fluid communication may be effected with one or more hoses, piping, swivels, flowline components, other components, or any combination thereof. The outlet ports 92a, 92b, 94a, 94b, 96a, and 96b are connected to the flow line 84a. In some embodiments, one, or more, of the outlet ports 92a, 92b, 94a, 94b, 96a, and 96b include caps and/or valves such as, for example, butterfly valves to limit or otherwise control the flow of the hydraulic fracturing fluid to the hydraulic fracturing pumps 18a, 18b, or 18c. In an exemplary embodiment, the hydraulic fracturing pumps 18a, 18b, and 18c (shown in FIGS. 1A and 2A; not visible in FIG. 5) are in fluid communication with the flow line 84a via both of the outlet ports 92a and 92b, both of the outlet ports 94a and 94b, and both of the outlet ports 96a and 96b, respectively; such fluid communication may be effected with one or more hoses, piping, flowline components, other components, or any combination thereof.

The hydraulic fracturing pumps 18d, 18e and 18f (shown in FIGS. 1A and 2A; not visible in FIG. 5) are adapted to be in fluid communication with the flow line 84b via one of outlet ports 98a and 98b, one of outlet ports 100a and 100b, and one of outlet ports 102a and 102b, respectively; such fluid communication may be effected with one or more hoses, piping, swivels, flowline components, other components, or any combination thereof. The outlet ports 98a, 98b, 100a, 100b, 102a, and 102b are connected to the flow line 84b. In some embodiments, one, or more, of the outlet ports 98a, 98b, 100a, 100b, 102a, and 102b include caps and/or valves such as, for example, butterfly valves to limit or otherwise control the flow of the hydraulic fracturing fluid to the hydraulic fracturing pumps 18d, 18e or 18f. In an exemplary embodiment, the hydraulic fracturing pumps 18d, 18e, and 18f (shown in FIGS. 1A and 2A; not visible in FIG. 5) are in fluid communication with the flow line 84b via both of the outlet ports 98a and 98b, both of the outlet ports 100a and 100b, and both of the outlet ports 102a and 102b, respectively; such fluid communication may be effected with one or more hoses, piping, flowline components, other components, or any combination thereof.

Figure 6:
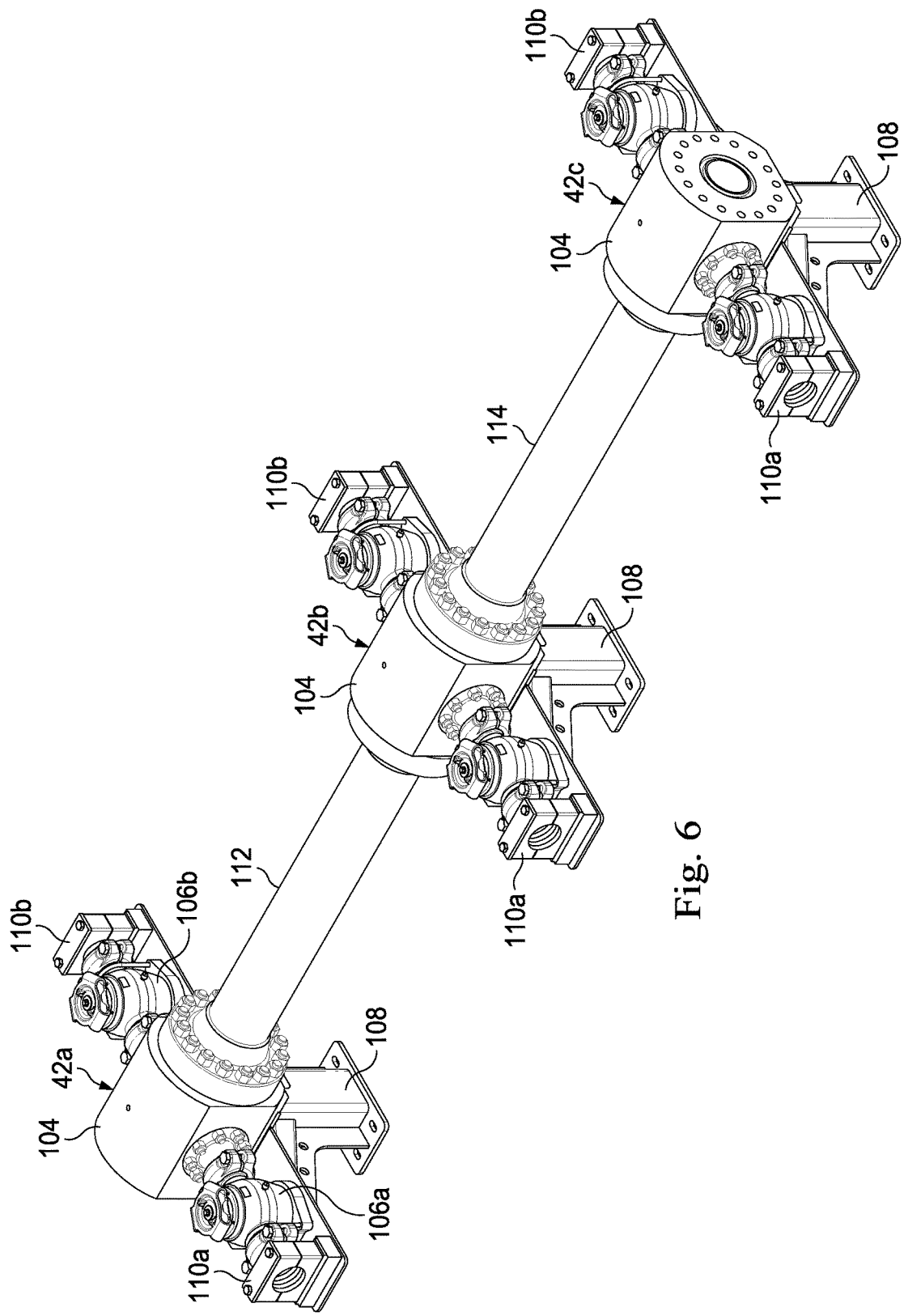
FIG. 6 is a perspective view of the high pressure manifold of FIGS. 2A and 2B, according to one or more embodiments of the present disclosure.

The high pressure modules 42a-c are identical to one another, and, therefore, in connection with FIG. 6, only the high pressure module 42a will be described in detail below; however, the description below applies to every one of the high pressure modules 42a-c. Moreover, in connection with FIG. 6, parts of the high pressure modules 42b and 42c that are substantially identical to corresponding parts of the high pressure module 42a are given the same reference numerals. Turning to FIG. 6, the high pressure module 42a includes a fluid block 104, valves such as, for example, plug valves 106a and 106b, and a vertical support 108. The plug valves 106a and 106b are connected to opposing sides of the fluid block 104. In addition, a connector 110a is connected to the plug valve 106a opposite the fluid block 104, and a connector 110b is connected to the plug valve 106b opposite the fluid block 104. The vertical support 108 is adapted to support the fluid block 104, the plug valves 106a and 106b, and the connectors 110a and 110b in an elevated position above the skid 40 (or another horizontal surface).

The high pressure module 42a's fluid block 104 is connected to the corresponding fluid block 104 of the high pressure module 42b via a longitudinally-extending tubular member, or flow line 112, and the high pressure module 42b's fluid block 104 is connected to the corresponding fluid block 104 of the high pressure module 42c via a longitudinally-extending tubular member, or flow line 114. More particularly, the respective fluid blocks 104 of the high pressure modules 42a and 42b are connected to opposing end portions of the flow line 112, and the respective fluid blocks 104 of the high pressure modules 42b and 42c are connected to opposing end portions of the flow line 114. As a result, the respective vertical supports 108 of the high pressure modules 42a-c are adapted to support the respective fluid blocks 104 and the flow lines 112 and 114 in an elevated position above the skid 40 (or the another horizontal surface).

The hydraulic fracturing pumps 18a, 18b, and 18c (shown in FIGS. 1A and 2A; not visible in FIG. 6) are adapted to be in fluid communication with the respective fluid blocks 104 of the high pressure modules 42a-c via the respective plug valves 106a; such fluid communication may be effected by connecting, to the respective connectors 110a of the high pressure modules 42a-c, one or more hoses, piping, swivels, flowline components, other components, or any combination thereof. The hydraulic fracturing pumps 18d, 18e, and 18f (shown in FIGS. 1A and 2A; not visible in FIG. 6) are adapted to be in fluid communication with the respective fluid blocks 104 of the high pressure modules 42a-c via the respective plug valves 106b; such fluid communication may be effected by connecting, to the respective connectors 110b of the high pressure modules 42a-c, one or more hoses, piping, swivels, flowline components, other components, or any combination thereof.

Figure 7:
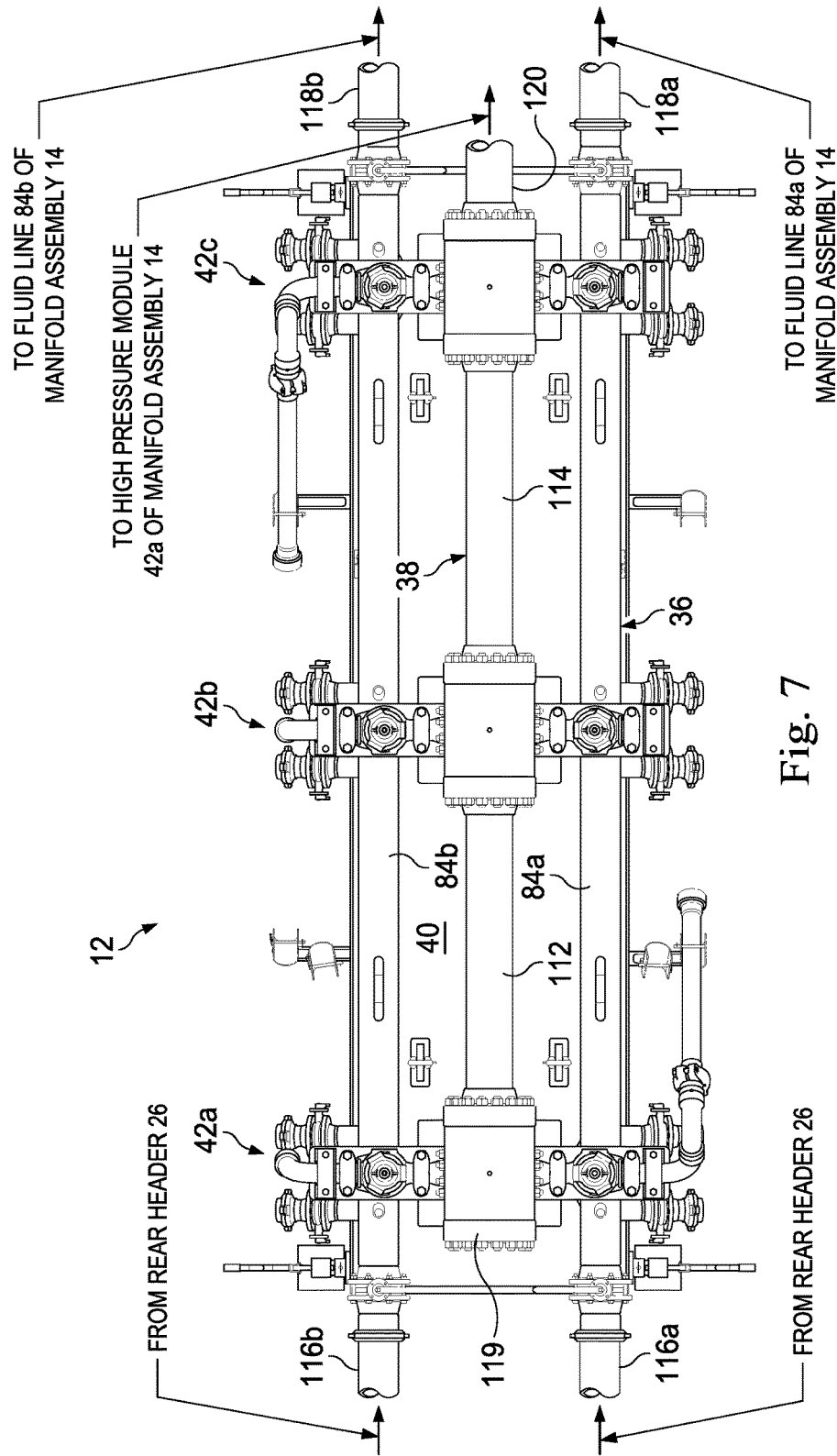
FIGS. 7 and 8 are top plan and elevational views, respectively, of the first manifold assembly of FIG. 2B connected between the rear header (shown in FIG. 1B) and the second manifold assembly, according to one or more embodiments of the present disclosure.
Figure 8:
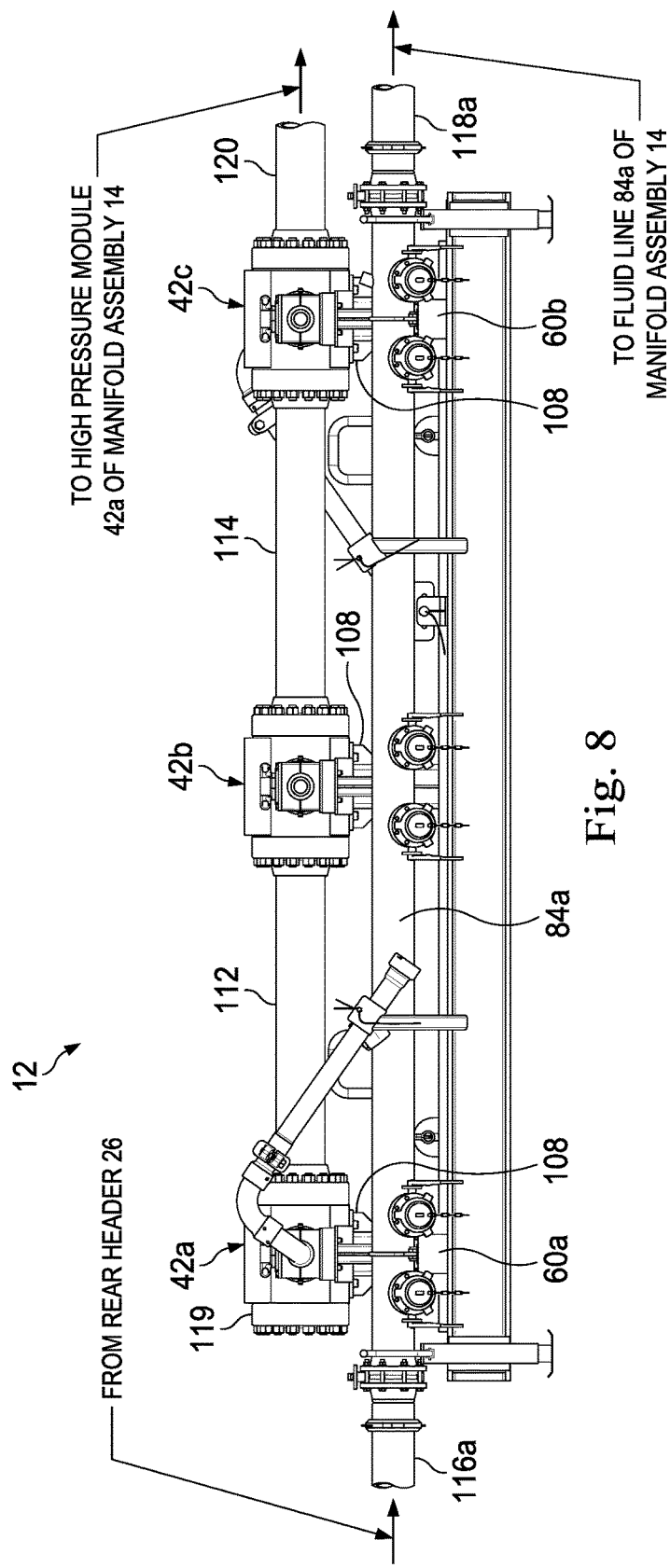

Turning to FIGS. 2B, 7, and 8, with continuing reference to FIGS. 3-6, the manifold assembly 12 is shown in a fully assembled state connected between the rear header 26 and the manifold assembly 14. The low pressure manifold 36 is mounted to the skid 40 via the flow line 84a's connection to the trucks 60a and 60b, and the flow line 84b's connection to the trucks 60c and 60d. The flow lines 84a and 84b of the low pressure manifold 36 are connected to, and in fluid communication with, the rear header 26 (not visible in FIGS. 7 and 8; shown in FIG. 1B) via longitudinally-extending tubular members, or flow lines 116a and 116b, respectively. The manifold assembly 12's low pressure manifold 36 is connected to, and in fluid communication with, the low pressure manifold of the manifold assembly 14 (not visible in FIGS. 7 and 8; shown in FIG. 1B) via longitudinally-extending tubular members, or flow lines 118a and 118b, respectively. In addition, the high pressure manifold 38 is mounted to the skid 40 via connection of the vertical supports 108 of the high pressure modules 42a-c to the transversely-extending structural members 48a-c, respectively, of the skid 40. The manifold assembly 12's high pressure module 42a includes a blind flange 119 connected to the fluid block 104 thereof. The manifold assembly 12's high pressure module 42c is connected to, and in fluid communication with, the high pressure manifold of the manifold assembly 14 (not visible in FIGS. 7 and 8; shown in FIG. 1B) via a longitudinally-extending tubular member, or flow line 120.

Figure 9:
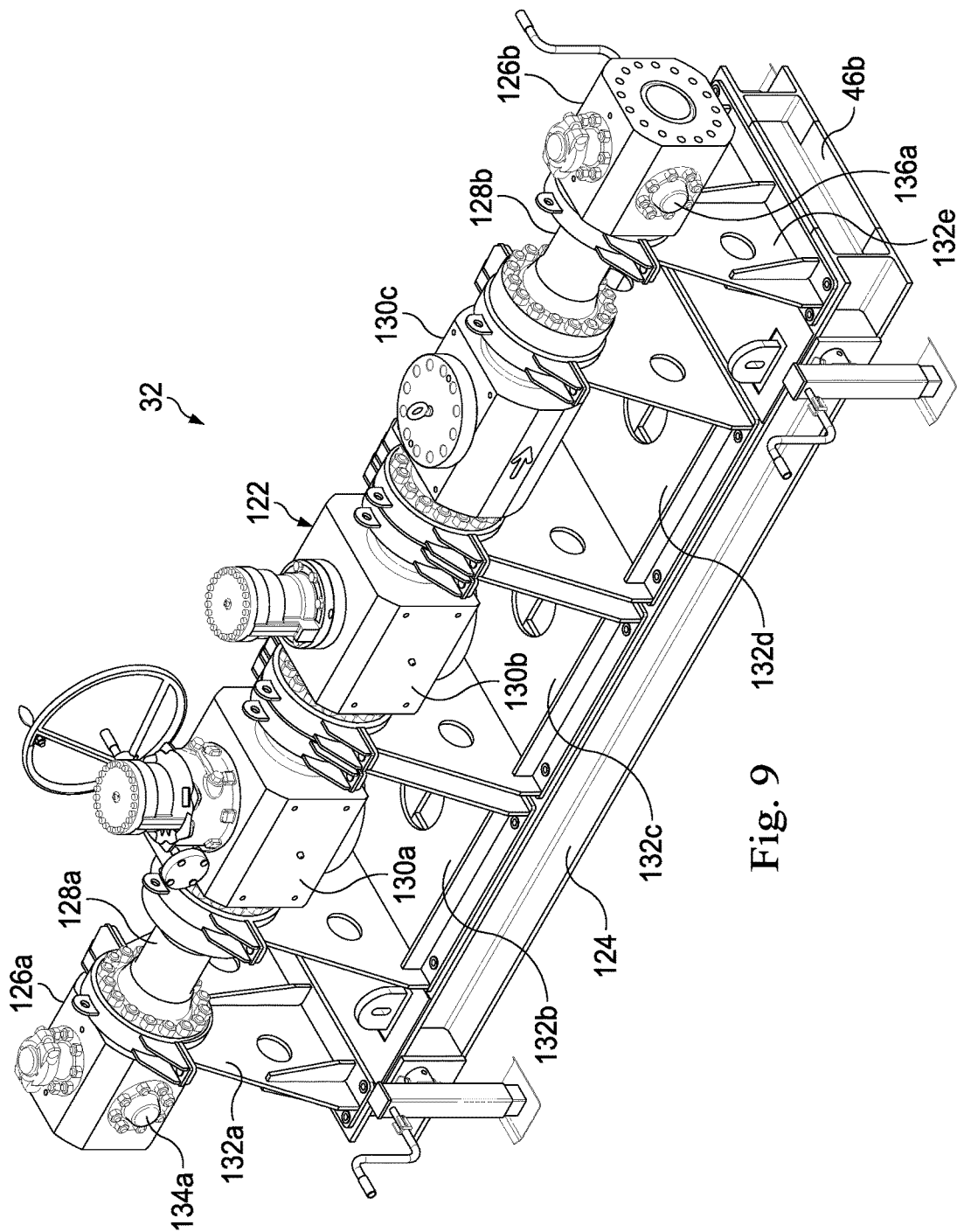
FIG. 9 is a perspective view of the valve assembly of FIGS. 1A and 1B, according to one or more embodiments of the present disclosure.

Turning to FIG. 9, with continuing reference to FIG. 1B, the valve assembly 32 includes a fluid conduit 122 mounted on, and connected to, a skid 124. The skid 124 is similar (or substantially identical) to the skid 40, and, therefore, the skid 124 will not be described in further detail; however, to the extent that parts of the skid are similar (or substantially identical) to corresponding parts of the skid 40, said similar (or substantially identical) parts are given the same reference numerals. The fluid conduit 122 includes fluid blocks 126a and 126b, longitudinally-extending tubular members, or flow lines 128a and 128b, and valves 130a-c. The fluid blocks 126a and 126b, the flow lines 128a and 128b, and the valves 130a-c are connected to each other in series and supported in an elevated position above the skid 124 by vertical supports 132a-e. In some embodiments, the valves 130a and 130b are plug valves (e.g., the valve 130a may be a manual plug valve, and the valve 130b may be an automatic plug valve). In some embodiments, the valve 130c is a check valve. In an embodiment, the fluid conduit 122 is connected to the skid 124 by lowering the fluid conduit 122 down and then ensuring that the fluid blocks 126a and 126b and the flow lines 128a and 128b are supported by the vertical supports 132a and 132e, respectively, and that the valves 130a-c are supported by the vertical supports 132b-d, respectively.

The fluid block 126a is connected to the flow line 128a and supported by the vertical support 132a in an elevated position above the skid 124 at or near the transversely-extending end member 46a (visible in FIG. 11) thereof. The valve 130a is connected to the flow line 128a opposite the fluid block 126a and supported by the vertical support 130b in an elevated position above the skid 124. The fluid block 126b is connected to the flow line 128b and supported by the vertical support 132e in an elevated position above the skid 124 at or near the transversely-extending end member 46b thereof. The valve 130c is connected to the flow line 128b opposite the fluid block 126b and supported by the vertical support 132d in an elevated position above the skid 124. Finally, the valve 130b is connected between the valves 130a and 130c and supported by the vertical support 132c in an elevated position above the skid 124.

In an embodiment, side ports 134a and 134b (visible in FIG. 11) of the fluid block 126a and/or side ports 136a and 136b (visible in FIG. 11) of the fluid block 126b may be used to establish fluid communication with the fluid conduit 122; such fluid communication may be effected with one or more hoses, piping, swivels, flowline components, other components, or any combination thereof. Moreover, such fluid communication may be used, for example, to support instrumentation (not shown) for measuring one or more characteristics of the hydraulic fracturing fluid exiting the respective high pressure manifolds 38 of the manifold assemblies 12 and 14.

Figure 10:
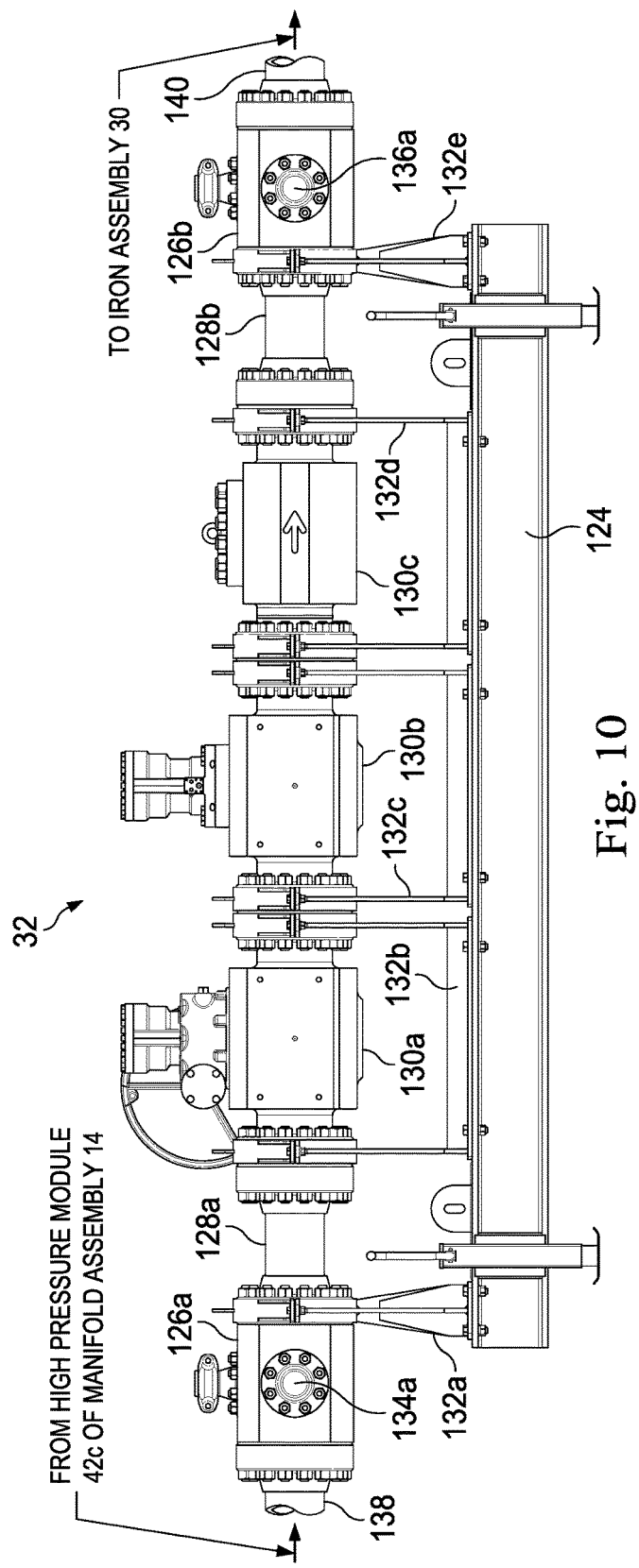
FIGS. 10 and 11 are elevational and top plan views, respectively, of the valve assembly of FIG. 9 connected between the second manifold assembly and the iron assembly, according to one or more embodiments of the present disclosure.
Figure 11:
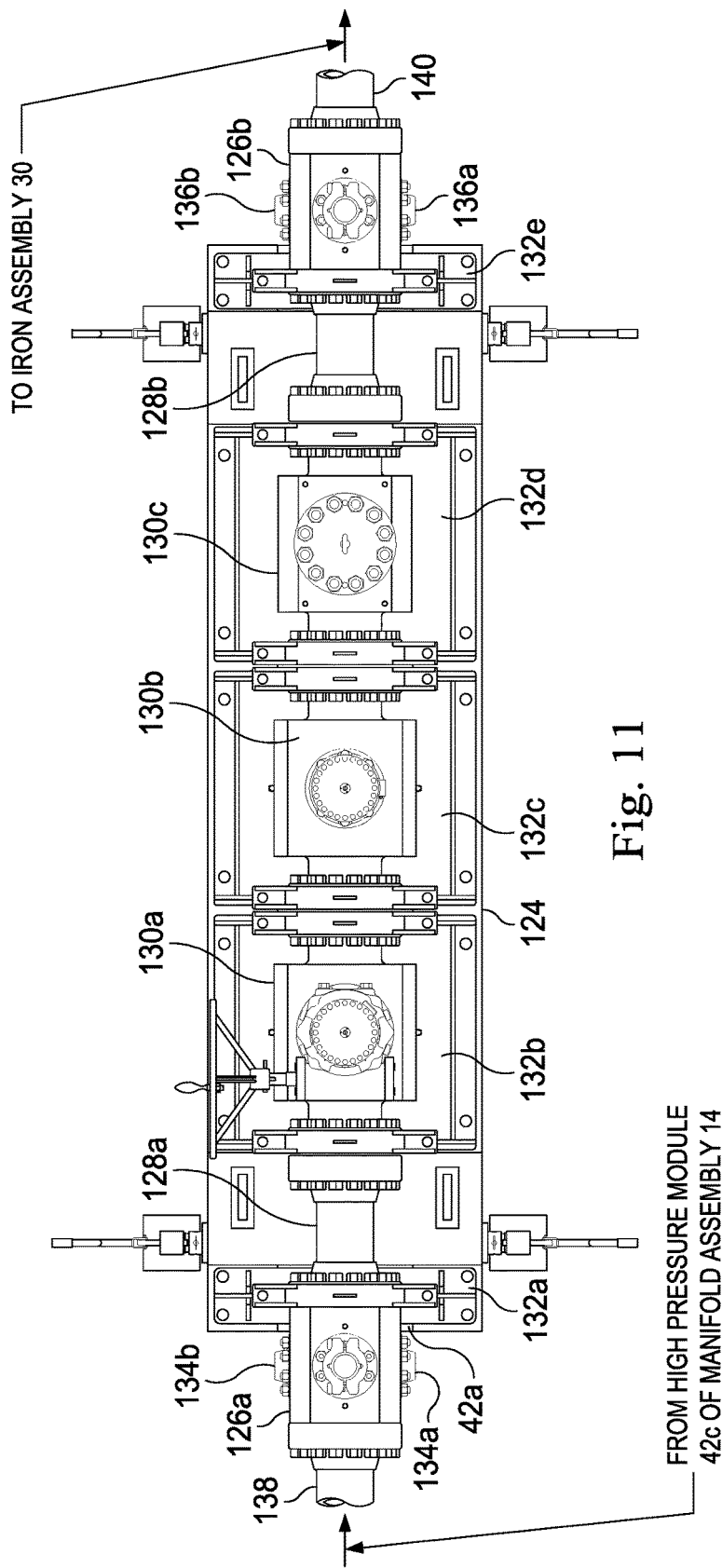

Turning to FIGS. 10 and 11, with continuing reference to FIG. 9, the valve assembly 32 is shown connected between the manifold assembly 14 and the iron assembly 30. More particularly, the fluid block 126a of the valve assembly 32 is connected to the manifold assembly 14's high pressure module 42c (not visible in FIGS. 10 and 11; shown, e.g., in FIG. 1B) via a longitudinally-extending tubular member, or flow line 138. In addition, the fluid block 126b of the valve assembly 32 is connected to the iron assembly 30 (not visible in FIGS. 10 and 11; shown, e.g., in FIG. 1B) via a longitudinally-extending tubular member, or flow line 140. As a result, the fluid conduit 122 of the valve assembly 32 is capable of communicating the hydraulic fracturing fluid from the high pressure module 42c of the manifold assembly 14 to the iron assembly 30.

Figure 12:
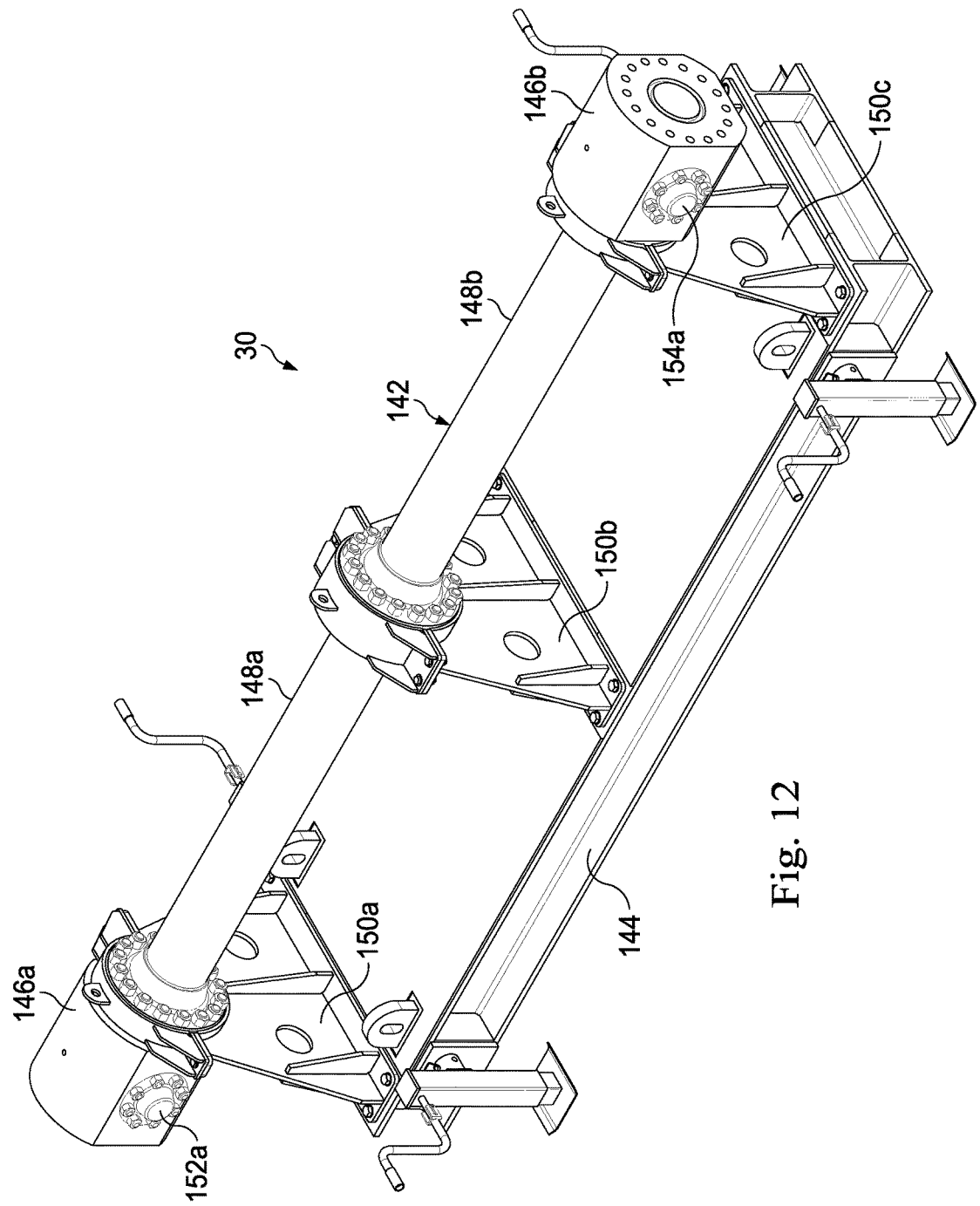
FIG. 12 is a perspective view of the iron assembly of FIGS. 1A and 1B, according to one or more embodiments of the present disclosure.

Turning to FIG. 12, with continuing reference to FIG. 1B, the iron assembly 30 includes a fluid conduit 142 mounted on, and connected to, a skid 144. The skid 144 is similar (or substantially identical) to the skid 40, and, therefore, the skid 144 will not be described in further detail; however, to the extent that parts of the skid 144 are similar (or substantially identical) to corresponding parts of the skid 40, said similar (or substantially identical) parts are given the same reference numerals. The fluid conduit 142 includes fluid blocks 146a and 146b and longitudinally-extending tubular members, or flow lines 148a and 148b. The fluid blocks 146a and 146b and the flow lines 148a and 148b are connected to each other in series and supported in an elevated position above the skid 144 by vertical supports 150a-c. In an embodiment, the fluid conduit 142 is connected to the skid 144 by lowering the fluid conduit 142 down and then ensuring that the fluid block 146a and the flow line 148a are supported by the vertical support 150a, the flow lines 148a and 148b are supported by the vertical support 150b, and the fluid block 146b and the flow line 148b are supported by the vertical support 150c. The fluid block 146a is connected to the flow line 148a and supported by the vertical support 150a in an elevated position above the skid 144 at or near the transversely-extending end member 46a thereof. The fluid block 146b is connected to the flow line 148b and supported by the vertical support 150c in an elevated position above the skid 144 at or near the transversely-extending end member 46b thereof. The flow lines 148a and 148b are connected to each other and supported by the vertical support 150b in an elevated position above the skid 144.

In an embodiment, side ports 152a and 152b (visible in FIG. 14) of the fluid block 146a and/or side ports 154a and 154b (visible in FIG. 14) of the fluid block 146b may be used to establish fluid communication with the fluid conduit 142; such fluid communication may be effected with one or more hoses, piping, swivels, flowline components, other components, or any combination thereof. Moreover, such fluid communication may be used, for example, to support instrumentation (not shown) for measuring one or more characteristics of the hydraulic fracturing fluid exiting the respective high pressure manifolds 38 of the manifold assemblies 12 and 14.

Figure 13:
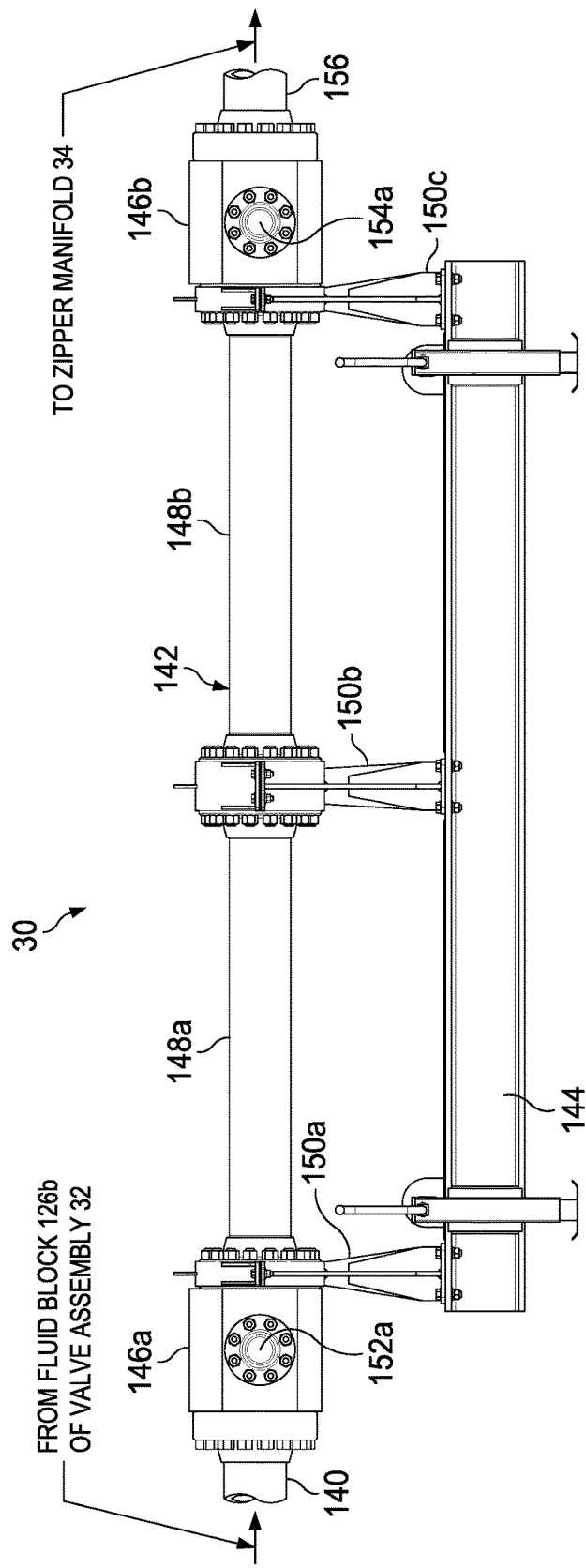
FIGS. 13 and 14 are elevational and top plan view, respectively, of the iron assembly of FIG. 12 connected between the valve assembly and the zipper manifold, according to one or more embodiments of the present disclosure.
Figure 14:
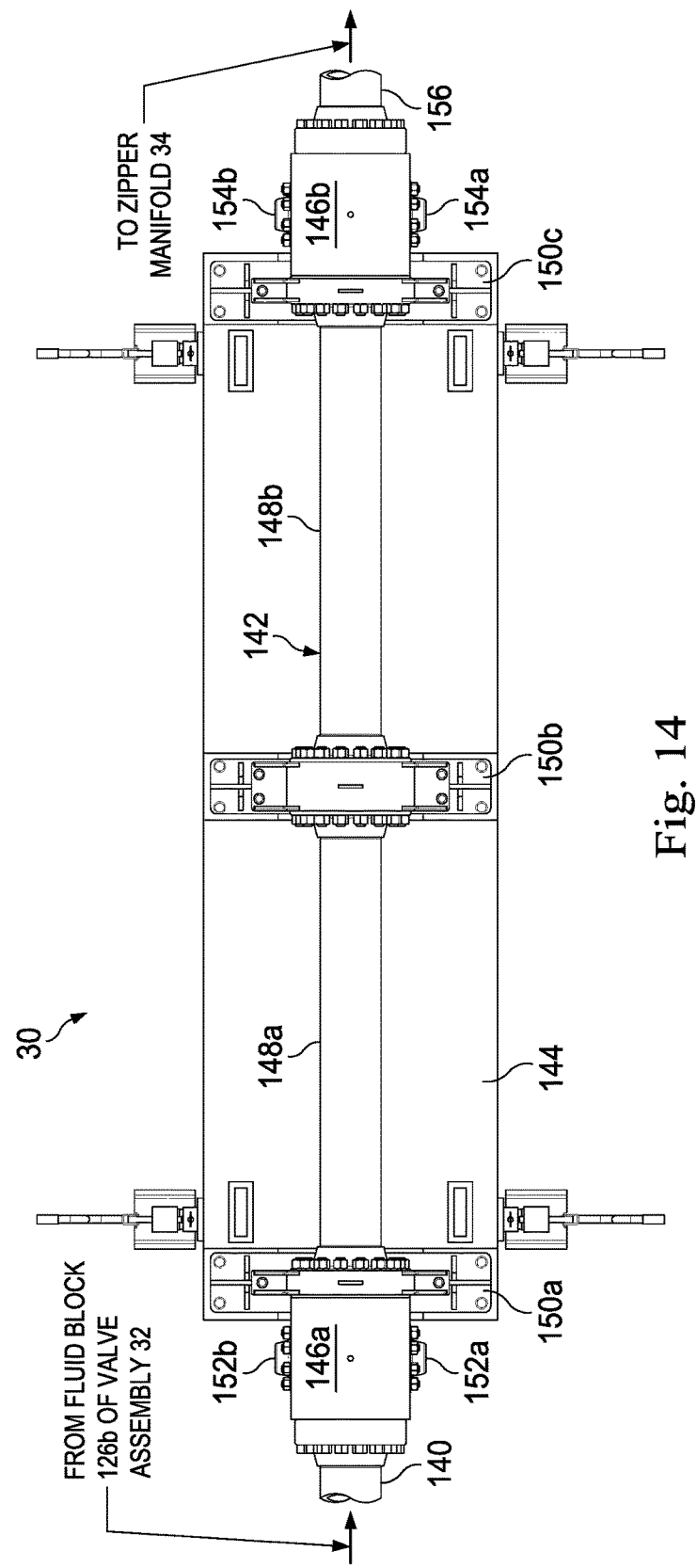

Turning to FIGS. 13 and 14, with continuing reference to FIG. 12, the iron assembly 30 is shown connected between the valve assembly 32 and the zipper manifold 34. More particularly, the fluid block 146a of the iron assembly 30, is connected to the valve assembly 32's fluid block 126b (not visible in FIGS. 13 and 14; shown, e.g., in FIG. 1B) via the flow line 140. In addition, the fluid block 146b of the iron assembly 30 is connected to the zipper manifold 34 (not visible in FIGS. 13 and 14; shown, e.g., in FIG. 1A) via a longitudinally-extending tubular member, or flow line 156. As a result, the fluid conduit 142 of the iron assembly 30 is capable of communicating the hydraulic fracturing fluid from the fluid block 126b of the valve assembly 32 to the zipper manifold 34.

Figure 15:
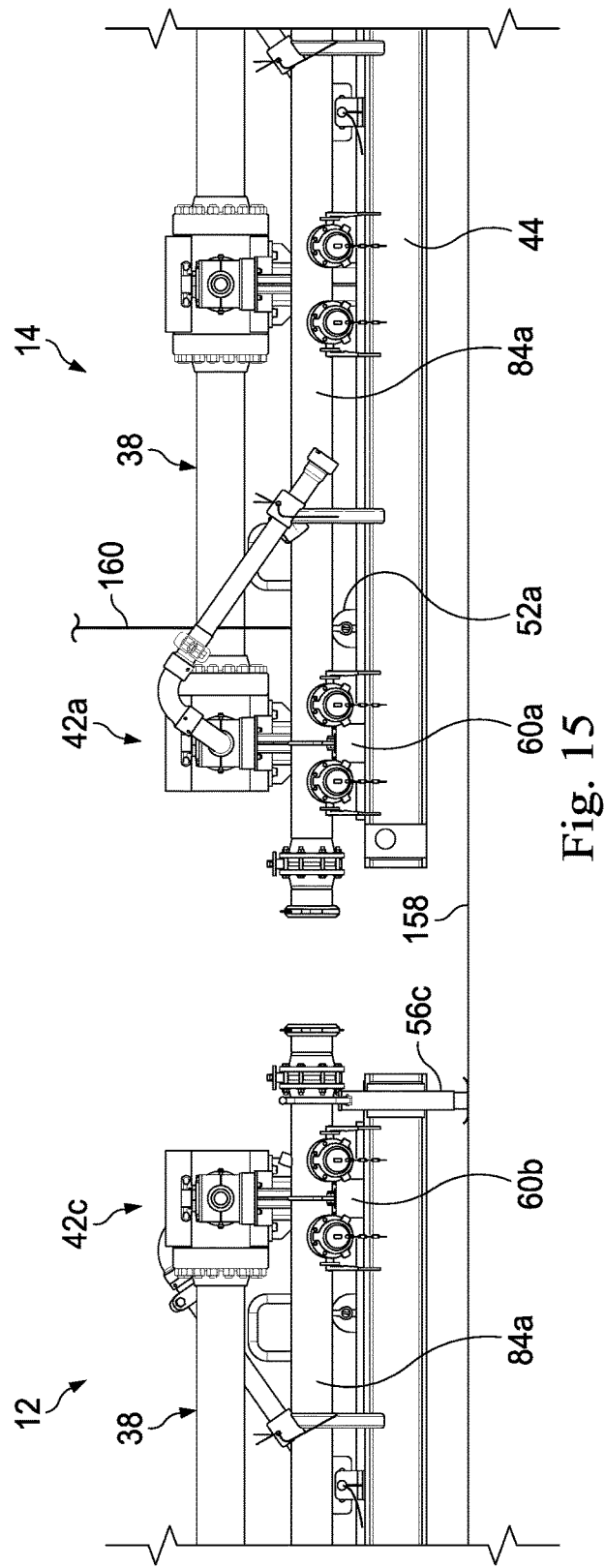
FIGS. 15-18 are perspective views illustrating first, second, third, and fourth stages, respectively, for connecting the second manifold assembly to the first manifold assembly to form a pressurization manifold, according to one or more embodiments of the present disclosure.
Figure 16:
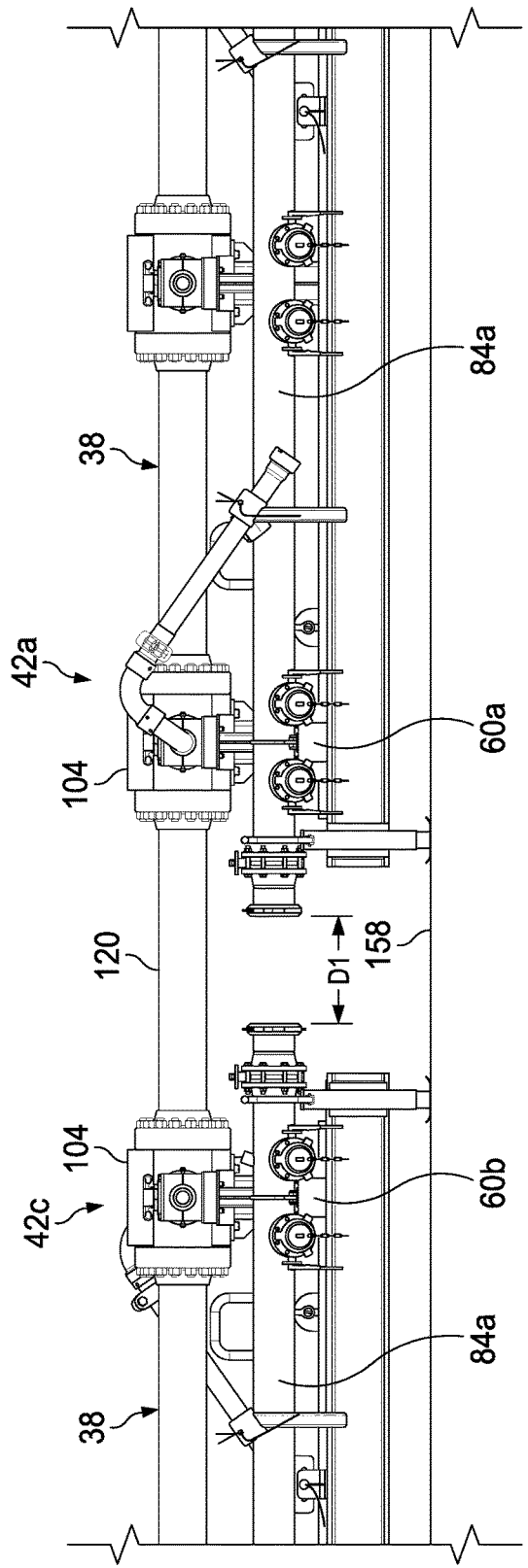

Turning to FIGS. 15-18, with continuing reference to FIGS. 7 and 8, an embodiment of the manner in which the manifold assembly 14 is connected to the manifold assembly 12 is illustrated. In connection with FIGS. 15-18, parts of the manifold assembly 14 that are substantially identical to corresponding parts of the manifold assembly 12 are given the same reference numerals. The manifold assembly 14 is suspended above a generally horizontal surface 158 (e.g., the ground) adjacent the manifold assembly 12 using a lifting mechanism 160 (e.g., a crane, a forklift, a front-end loader, a backhoe, an excavator, or another lifting mechanism) connected to the skid 40's lifting tabs 52a-d, as shown in FIG. 15. The manifold assembly 14 continues to be so suspended above the generally horizontal surface 158 adjacent the manifold assembly 12 to facilitate connection of the flow line 120 between the fluid block 104 of the manifold assembly 12's high pressure module 42c and the fluid block 104 of the manifold assembly 14's high pressure module 42a, as shown in FIG. 16. Moreover, upon connection of the flow line 120 between the fluid block 104 of the manifold assembly 12's high pressure module 42c and the fluid block 104 of the manifold assembly 14's high pressure module 42a, a distance D1 is defined between the manifold assembly 12's flow line 84a and the manifold assembly 14's flow line 84a.

Figure 17:
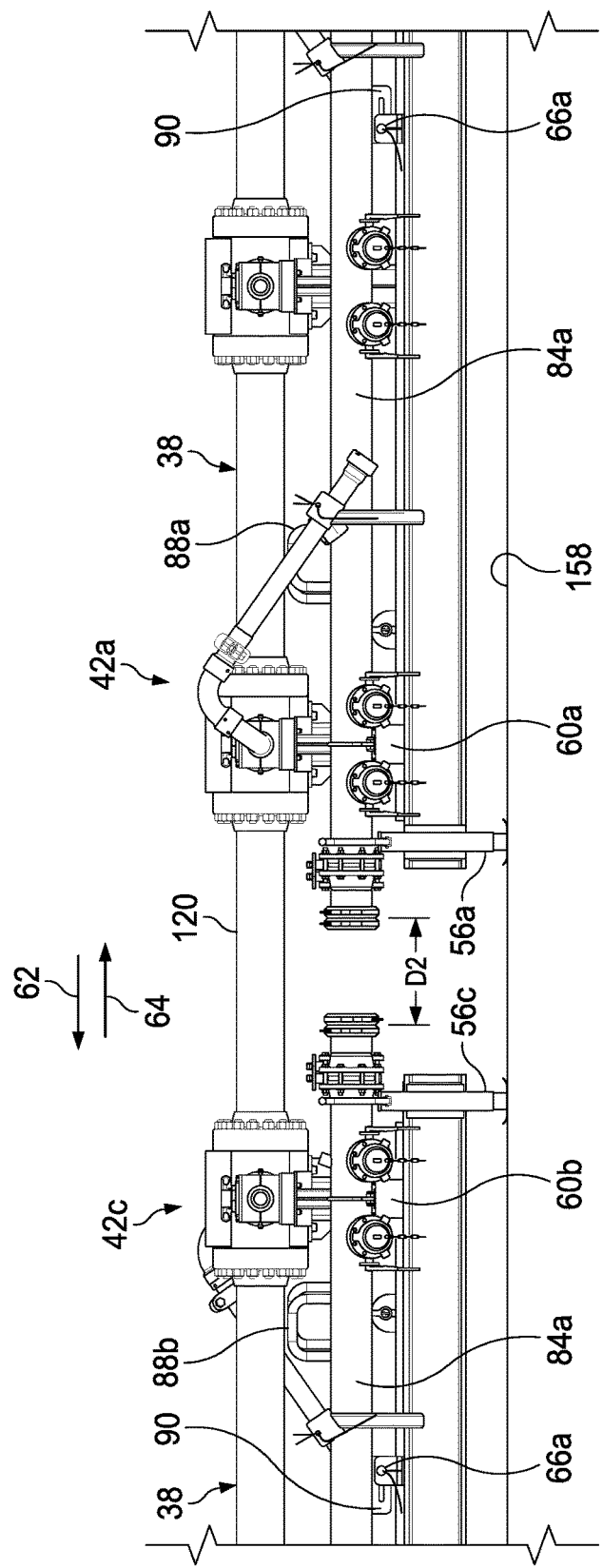
Figure 18:
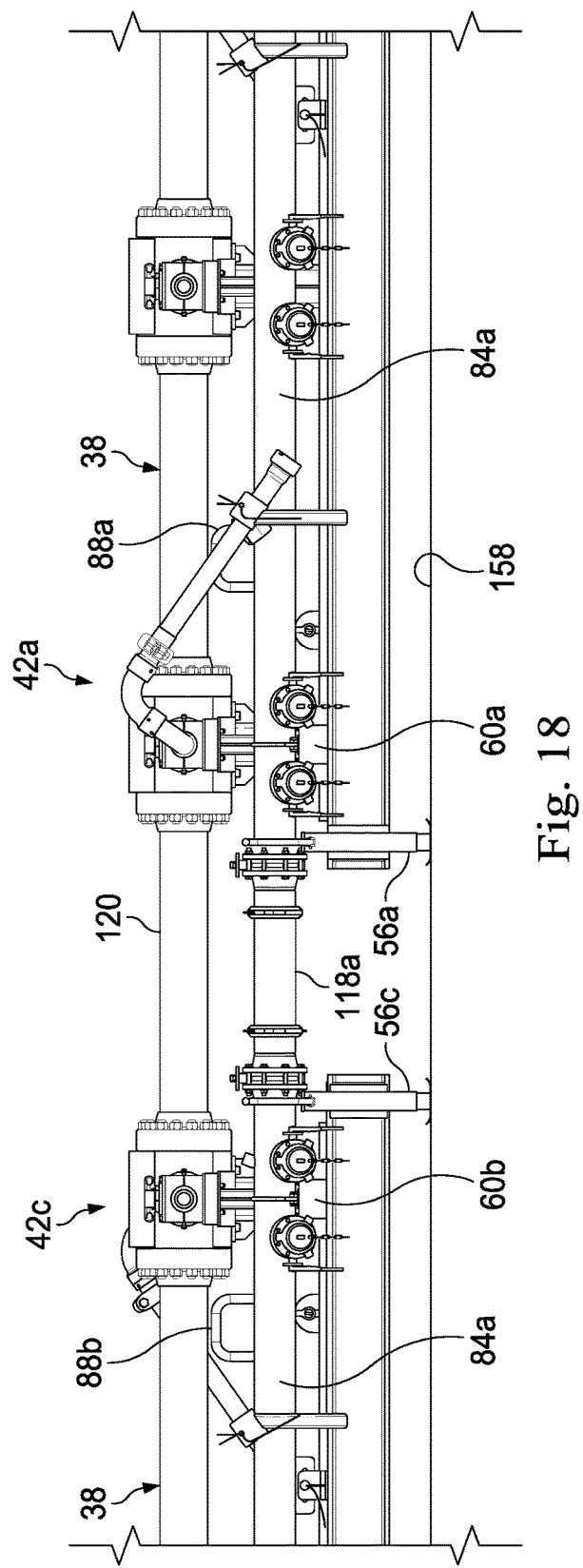

The manifold assembly 12's flow line 84a is displaced via the associated trucks 60a and 60b in the longitudinal direction 62, and/or the manifold assembly 14's flow line 84a is displaced via the associated trucks 60a and 60b in the longitudinal direction 64, as shown in FIG. 17. The displacement of the flow line 84a of the manifold assembly 12's low pressure manifold 36 in the longitudinal direction 62, and/or the displacement of the flow line 84a of the manifold assembly 14's low pressure manifold 36 in the longitudinal direction 64, causes a distance D2 to be defined between the manifold assembly 12's flow line 84a and the manifold assembly 14's flow line 84a. The distance D2 is greater than the distance D1, thereby permitting the connection of the flow line 118a between the respective flow lines 84a of the manifold assemblies 12 and 14, as shown in FIG. 18. Moreover, during the displacement of the flow line 84a of the manifold assembly 12's low pressure manifold 36 in the longitudinal direction 62, and/or the displacement of the flow line 84a of the manifold assembly 14's low pressure manifold 36 in the longitudinal direction 64, the respective locking tabs 66a and 66b engage the locking tabs 90 to thereby limit the movement of the respective flow lines 84a in the longitudinal directions 62 and 64.

The manner in which the flow line 118b is connected between the respective flow lines 84b of the manifold assemblies 12 and 14 is substantially identical to the manner in which the flow line 118a is connected between the respective flow lines 84a of the manifold assemblies 12 and 14, and, therefore, will not be described in further detail. The jacks 56a-d may be connected to the skid 40 and lowered to support the manifold assembly 14 before, during, or after, the connection of the flow line 120 between the fluid block 104 of the manifold assembly 12's high pressure module 42c and the fluid block 104 of the manifold assembly 14's high pressure module 42a, as shown in FIG. 16. In addition, or as an alternative, the jacks 56a-d may be connected to the skid 40 and lowered to support the manifold assembly 14, before, during, or after, the connection of the flow lines 118a and 118b between the respective low pressure manifolds 36 of the manifold assemblies 12 and 14.

In operation, the hydraulic fracturing fluid is prepared in the blender 16 and communicated to the pressurization manifold 22 via the rear header 26. The respective valves 86a of the manifold assembly 12's flow lines 84a and 84b are opened to permit communication of the hydraulic fracturing fluid from the rear header 26 to the flow lines 84a and 84b via the flow lines 116a and 116b. Moreover, the respective valves 86b of the manifold assembly 12's flow lines 84a and 84b, and the respective valves 86b of the manifold assembly 14's flow lines 84a and 84b, are opened to permit communication of the hydraulic fracturing fluid from the low pressure manifold 36 of the manifold assembly 12 to the low pressure manifold 36 of the manifold assembly 14 via the flow lines 118a and 118b. The respective valves 86b of the manifold assembly 14's flow lines 84a and 84b are closed to cap the low pressure manifold 36 of the manifold assembly 14. The hydraulic fracturing fluid is communicated from the manifold assembly 12's low pressure manifold 36 to the respective hydraulic fracturing pumps 18a-f via one (or both) of outlet ports 92a and 92b, one (or both) of outlet ports 94a and 94b, and one (or both) of outlet ports 96a and 96b, one (or both) of outlet ports 98a and 98b, one (or both) of outlet ports 100a and 100b, and one (or both) of outlet ports 102a and 102b. The hydraulic fracturing pumps 18a-f receive, pressurize, and communicate the hydraulic fracturing fluid to the associated high pressure module 42a 42b, or 42c of the manifold assembly 12's high pressure manifold 38. The blind flange 119 connected to the fluid block 104 of the manifold assembly 12's high pressure module 42a prevents communication of the hydraulic fracturing fluid to atmosphere. In a similar manner, the hydraulic fracturing fluid is communicated from the manifold assembly 14's low pressure manifold 36 to the respective hydraulic fracturing pumps 18g-1, and from the respective hydraulic fracturing pumps 18g-1 to the manifold assembly 14's high pressure modules 42a, 42b, or 42c.

The hydraulic fracturing fluid is communicated from the pressurization manifold 22 to the valve assembly 32 via the respective fluid blocks 104 of the manifold assembly 12's high pressure modules 42a-c, the manifold assembly 12's flow lines 112 and 114, the flow line 120 connected between the fluid block 104 of the manifold assembly 12's high pressure module 42c and the fluid block 104 of the manifold assembly 14's high pressure module 42a, the respective fluid blocks 104 of the manifold assembly 14's high pressure modules 42a-c, the manifold assembly 14's flow lines 112 and 114, and the flow line 138 connected between the fluid block 104 of the manifold assembly 14's high pressure module 42c and the valve assembly 32's fluid block 126a.

The hydraulic fracturing fluid is communicated from the valve assembly 32 to the iron assembly 30 via the fluid block 126a, the flow line 128a, the valve 130a, the valve 130b, the valve 130c, the flow line 128b, the fluid block 126b, and the flow line 140 connected between the valve assembly 32's fluid block 126b and the iron assembly 30's fluid block 146a. In those embodiments in which the valves 130a and 130b are plug valves, the valves 130a and 130b are operable to selectively prevent communication of the hydraulic fracturing fluid from the manifold assembly 14 to the iron assembly 30 via the valve assembly 32. In those embodiments in which the valve 130b is a check valve, the valve 130b is operable to prevent backflow of the hydraulic fracturing fluid from the iron assembly 30 to the manifold assembly 14 via the valve assembly 32. In some embodiments, during the communication of the hydraulic fracturing fluid from the valve assembly 32 to the iron assembly 30, at least one of the side ports 134a, 134b, 136a and 136b of the fluid blocks 126a or 126b is used to establish fluid communication with the fluid conduit 122 and to support instrumentation (not shown) for measuring one or more characteristics of the hydraulic fracturing fluid exiting the respective high pressure manifolds 38 of the manifold assemblies 12 and 14.

The hydraulic fracturing fluid is communicated from the iron assembly 30 to the zipper manifold 34 via the fluid block 146a, the flow line 148a, the flow line 148b, the fluid block 146b, and the flow line 156 connected between the iron assembly 30's fluid block 146b and the zipper manifold 34. In some embodiments, during the communication of the hydraulic fracturing fluid from the iron assembly 30 to the zipper manifold 34, at least one of the side ports 152a, 152b, 154a and 154b of the fluid blocks 146a or 146b is used to establish fluid communication with the fluid conduit 142 and to support instrumentation (not shown) for measuring one or more characteristics of the hydraulic fracturing fluid exiting the respective high pressure manifolds 38 of the manifold assemblies 12 and 14.

The system 10 has been described herein as including the manifold assemblies 12 and 14, the valve assembly 32, and the iron assembly 30; however, the iron assembly 30 may be omitted and the valve assembly 32 may instead be connected between the manifold assembly 14 and the zipper manifold 34; the valve assembly 32 may be omitted and the iron assembly may instead be connected between the manifold assembly 14 and the zipper manifold; or the iron assembly 30 and the valve assembly 32 may be omitted and the manifold assembly 14 may be connected to the zipper manifold 34. Moreover, systems analogous to the system 10 are contemplated in which varying numbers of manifold assemblies, valve assemblies, and iron assemblies are used to construct the system depending on the particular requirements of the fracturing job.

In some embodiments, the flow lines 84a and 84b of the manifold assembly 12's low pressure manifold 36 define first and second inner diameters, respectively, and the flow lines 112 and 114 of the manifold assembly 12's high pressure manifold 38 each define a third inner diameter, the third inner diameter being greater than the first and second inner diameters. In some embodiments, fluid blocks 104 of the manifold assembly 12's high pressure modules 42a-c each define an inner diameter substantially the same as the third inner diameter. In some embodiments, the flow lines 84a and 84b of the manifold assembly 14's low pressure manifold 36 define fourth and fifth inner diameters, respectively, and the flow lines 112 and 114 of the manifold assembly 14's high pressure manifold 38 each define a sixth inner diameter, the sixth inner diameter being greater than the fourth and fifth inner diameters. In some embodiments, fluid blocks 104 of the manifold assembly 14's high pressure modules 42a-c each define an inner diameter substantially the same as the sixth inner diameter. In several embodiments, the third and sixth inner diameters are about 5⅛ inches, are greater than about 5⅛ inches, range from about 5⅛ inches to about 7 1/16 inches, or are about 7 1/16 inches.

In some embodiments, the flow lines 128a and 128b of the valve assembly 32 each define a seventh inner diameter, the seventh inner diameter being about the same as the third and sixth inner diameters of the manifold assemblies 12 and 14, respectively. In some embodiments, the fluid blocks 126a and 126b and/or the valves 130a-130c of the valve assembly 32 each define an inner diameter substantially the same as the seventh inner diameter. In some embodiments, the components (i.e., the one or more hoses, piping, swivels, flowline components, other components, or any combination thereof) used to establish fluid communication with the fluid block 126a or 126b via the side ports 134a and 134b or the side ports 136a and 136b, respectively, each define an inner diameter smaller than the inner diameter of the fluid blocks 126a and 126b. For example, such components (and/or the side port(s) 134a, 134b, 136a, or 136b) may define an inner diameter of about 3 inches, and the fluid blocks 126a and 126b may define an inner diameter of about 7 inches.

In some embodiments, the flow lines 148a and 148b of the iron assembly 30 each define an eighth inner diameter, the eighth inner diameter being about the same as the third and sixth inner diameters of the manifold assemblies 12 and 14, respectively. In some embodiments, the fluid blocks 146a and 146b of the iron assembly 30 each define an inner diameter substantially the same as the eighth inner diameter. In some embodiments, the components (i.e., the one or more hoses, piping, swivels, flowline components, other components, or any combination thereof) used to establish fluid communication with the fluid block 146a or 146b via the side ports 152a and 152b or the side ports 154a and 154b, respectively, each define an inner diameter smaller than the inner diameter of the fluid blocks 146a and 146b. For example, such components (and/or the side port(s) 152a, 152b, 154a, or 154b) may define an inner diameter of about 3 inches, and the fluid blocks 146a and 146b may define an inner diameter of about 7 inches.

In some embodiments, the hydraulic fracturing system 10 described herein decreases setup time and labor costs, provides adjustability, decreases safety risks associated with potential leak points, and/or increases pumping efficiency during hydraulic fracturing operations. As a result, in some embodiments, the hydraulic fracturing system 10 increases the overall effectiveness of fracturing operations, thereby enabling operators to effective address challenges such as, for example, continuous duty operations, harsh downhole environments, and multiple extended-reach lateral wells, among others.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. An apparatus used to hydraulically fracture a subterranean formation in which a wellbore extends, the apparatus comprising:
    a first platform supporting:
        first and second flow lines adapted to be in fluid communication with first and second pumps, respectively, the first pump being adapted to pressurize fluid received from the first flow line, and the second pump being adapted to pressurize fluid received from the second flow line, and
        a third flow line adapted to convey pressurized fluid from the first and second pumps toward the wellbore to hydraulically fracture the subterranean formation in which the wellbore extends; and
    a second platform, distinct from the first platform, supporting a fourth flow line in fluid communication with the third flow line, the fourth flow line adapted to convey the pressurized fluid from the third flow line toward the wellbore.

2. The apparatus of claim 1,
    wherein the apparatus is adapted to be connected to another apparatus used to hydraulically fracture the subterranean formation in which the wellbore extends; and
    wherein one, or both, of the first and second flow lines are movable relative to the third flow line to permit the connection of the apparatus to the another apparatus.

3. The apparatus of claim 1, wherein:
    the first platform and the second platform comprise separate skids, each skid having first and second rails; and
    first and second trucks to which the first and second flow lines, respectively, are connected;
    wherein one, or both, of the first and second trucks are movable along the first and second rails, respectively, to thereby permit the movement of one, or both, of the first and second flow lines relative to the third flow line.

4. The apparatus of claim 1, further comprising:
    a fluid block connected to the third flow line and adapted to receive the pressurized fluid from the first and second pumps; and
    first and second valves connected to the fluid block and adapted to selectively prevent communication of the pressurized fluid from the first and second pumps, respectively, to the fourth fluid line.

5. The apparatus of claim 4, wherein the second platform is supported in an elevated position above the first platform so that the third flow line is vertically offset from the fourth flow line.

6. The apparatus of claim 1, wherein the first, second, and third flow lines define first, second, and third, inner diameters, the third inner diameter being greater than the first and second inner diameters.

7. The apparatus of claim 1, further comprising a zipper manifold adapted to convey the pressurized fluid from the fourth flow line to the wellbore to hydraulically fracture the subterranean formation in which the wellbore extends.

* * * * *